United States Patent
Hazan et al.

(10) Patent No.: US 11,138,513 B2
(45) Date of Patent: Oct. 5, 2021

(54) DYNAMIC LEARNING SYSTEM

(71) Applicant: Princeton University, Princeton, NJ (US)

(72) Inventors: Elad Hazan, Princeton, NJ (US); Karan Singh, Princeton, NJ (US); Cyril Zhang, Princeton, NJ (US)

(73) Assignee: Princeton University, Princeton, NJ (US)

( * ) Notice: Subject to any disclaimer, the term of this patent is extended or adjusted under 35 U.S.C. 154(b) by 837 days.

(21) Appl. No.: 15/914,967

(22) Filed: Mar. 7, 2018

(65) Prior Publication Data

US 2018/0357554 A1 Dec. 13, 2018

Related U.S. Application Data

(60) Provisional application No. 62/518,682, filed on Jun. 13, 2017.

(51) Int. Cl.
| | |
|---|---|
| *G06N 7/00* | (2006.01) |
| *G06N 3/08* | (2006.01) |
| *G06F 17/17* | (2006.01) |
| *G06K 9/00* | (2006.01) |
| *G06K 9/62* | (2006.01) |
| *G06N 3/04* | (2006.01) |
| *G06F 17/11* | (2006.01) |
| *G06F 40/40* | (2020.01) |

(52) U.S. Cl.
CPC ............. *G06N 7/005* (2013.01); *G06F 17/11* (2013.01); *G06F 17/17* (2013.01); *G06F 40/40* (2020.01); *G06K 9/0053* (2013.01); *G06K 9/00536* (2013.01); *G06K 9/00664* (2013.01); *G06K 9/6262* (2013.01); *G06N 3/0454* (2013.01); *G06N 3/08* (2013.01); *G06N 3/084* (2013.01); *G06N 3/049* (2013.01)

(58) Field of Classification Search
None
See application file for complete search history.

(56) References Cited

U.S. PATENT DOCUMENTS 6,125,105 A * 9/2000 Edwards ............. H04L 12/5602
370/230

OTHER PUBLICATIONS

Anava, Oren, et al. "Online learning for time series prediction." Conference on learning theory. 2013. (Year: 2013).*

(Continued)

*Primary Examiner* — Kakali Chaki
*Assistant Examiner* — Chaitanya R Jayakumar
(74) *Attorney, Agent, or Firm* — Ajay A. Jagtiani; Miles & Stockbridge P.C.

(57) ABSTRACT

A method of performing time series prediction by improper learning comprising calculating a plurality of filters based on a symmetric matrix and generating a mapping term based on a time series input and a function. The method may include comprising iteratively: transforming the function using the calculated plurality of filters; predicting an interim output using the transformed function and the mapping term; computing an error of the interim output based on a known output; and updating the mapping term based on the computed error. The method may include generating the mapping term through iterations over a predetermined interval and performing a time series prediction using the mapping term generated over the iterations.

16 Claims, 9 Drawing Sheets

(56) References Cited

OTHER PUBLICATIONS

Zhigljavsky, Anatoly. "Singular spectrum analysis for time series: Introduction to this special issue." Statistics and its Interface 3.3 (2010): 255-258. (Year: 2010).*
Martens, James. "Learning the Linear Dynamical System with ASOS." ICML. 2010. (Year: 2010).*
Elad Hazan, Karan Singh, and Cyril Zhang. Learning linear dynamical systems via spectral filtering. In Advances in Neural Information Processing Systems, pp. 6705-6715, 2017.
Elad Hazan, Holden Lee, Karan Singh, Cyril Zhang, and Yi Zhang. Spectral filtering for general linear dynamical systems. arXiv preprint, arXiv:1802.03981, 2018.

* cited by examiner

DYNAMIC LEARNING SYSTEM

CROSS-REFERENCE TO RELATED APPLICATIONS

This application claims benefit of priority of provisional U.S. patent application Ser. No. 62/518,682 entitled, "METHOD FOR ONLINE LEARNING OF LINEAR DYNAMICAL SYSTEMS", filed Jun. 13, 2017.

BACKGROUND

Field of the Invention

The present disclosure relates generally to dynamic learning systems that leverage improper learning to improve predictive performance. Mathematical modeling has generated a class of state space models that accurately model many phenomena in nature and engineering, and are applied across time-series analysis, robotics, econometrics, medicine, meteorology, and other fields. For example, in a linear dynamical system (LDS) model, the time evolution of a system is explained by a linear map on a finite-dimensional hidden state.

Background of the Invention

An aspect of this field of study is the problem of system identification: given some sample trajectories, output parameters for an LDS which predict unseen future data. Some examples of this provide a non-convex optimization problem, for which efficient algorithms with theoretical guarantees are computational challenging. One standard heuristic for this problem is expectation-maximization (EM), which can often generate poor results in theory and practice. There exists a need to improve upon the performance, stability, and efficiency of such dynamic learning systems.

SUMMARY

According to first broad aspect, the present disclosure provides a method of performing time series prediction by improper learning, the method comprising: calculating a plurality of filters based on a symmetric matrix; transforming a function using the calculated plurality of filters; predicting an interim output of a time series input using the transformed function and a mapping term; computing an error of the interim output based on a known output; updating the mapping term based on the computed error; iterating the transforming, predicting, computing, and updating steps over a predetermined interval; and performing a time series prediction using the mapping term generated over the iterations.

According to a second broad aspect, the present disclosure provides a method of performing time series prediction by improper learning, the method comprising: calculating a plurality of filters based on a symmetric matrix; generating a mapping term based on a time series input and a function, the generating comprising iteratively: transforming the function using the calculated plurality of filters; predicting an interim output using the transformed function and the mapping term; computing an error of the interim output based on a known output; and updating the mapping term based on the computed error; wherein the mapping term is generated through iterations over a predetermined interval; and performing a time series prediction using the mapping term generated over the iterations.

BRIEF DESCRIPTION OF THE DRAWINGS

The accompanying drawings, which are incorporated herein and constitute part of this specification, illustrate exemplary embodiments, and, together with the general description given above and the detailed description given below, serve to explain the features of the disclosure.

DETAILED DESCRIPTION OF THE INVENTION

Definitions

Figure 1:
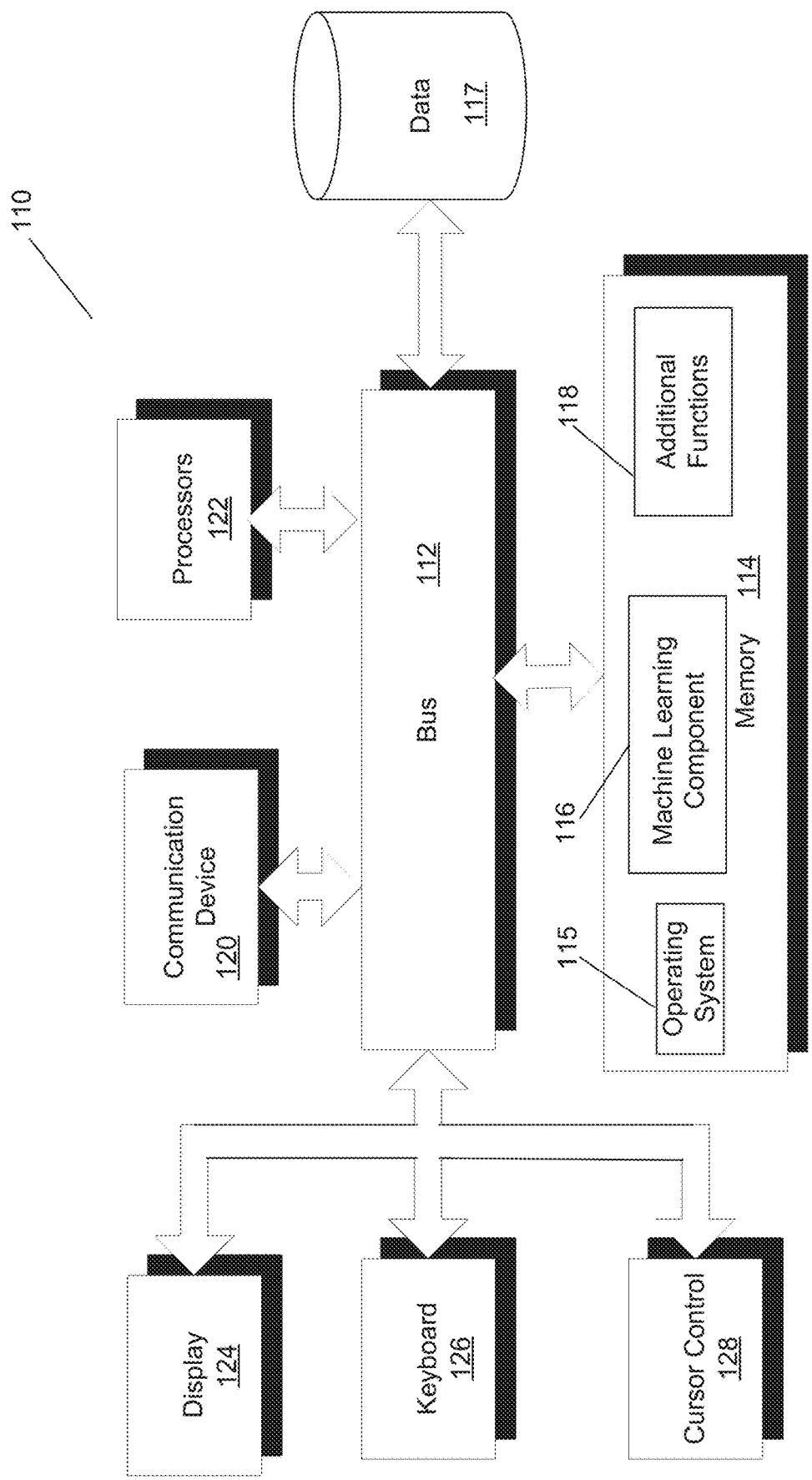
FIG. 1 is a block diagram of a computing device operatively coupled to a system for performing time series prediction by improper learning according to one embodiment of the present disclosure.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property, other factor, or conditional satisfaction.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "associated" with respect to data refers to data that are associated or linked to each other. For example, data relating the identity of an individual (identity data) wearing an integrated sensor module may be associated with the motion data for the individual obtained from an accelerometer or, optionally, from a gyroscope or, optionally, from the amplitude of the power signal from an energy harvester.

For purposes of the present disclosure, the term "computer" refers to any type of computer or other device that implements software including an individual computer such as a personal computer, laptop computer, tablet computer, mainframe computer, mini-computer, etc. A computer also refers to electronic devices such as an electronic scientific instrument such as a spectrometer, a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc. Various processes of the present disclosure may be carried out using a computer. Various functions of the present disclosure may be performed by one or more computers.

For the purposes of the present disclosure, the term "cloud computing" is synonymous with computing performed by computers that are located remotely and accessed via the Internet (the "Cloud"). It is a style of computing where the computing resources are provided "as a service", allowing users to access technology-enabled services "in the cloud" without knowledge of, expertise with, or control over the technology infrastructure that supports them. According to the IEEE Computer Society it "is a paradigm in which information is permanently stored in servers on the Internet and cached temporarily on clients that include desktops, entertainment centers, table computers, notebooks, wall computers, handhelds, etc." Cloud computing is a general concept that incorporates virtualized storage, computing and web services and, often, software as a service (SaaS), where the common theme is reliance on the Internet for satisfying the computing needs of the users. For example, Google Apps provides common business applications online that are accessed from a web browser, while the software and data are stored on the servers. Some successful cloud architectures may have little or no established infrastructure or billing systems whatsoever including Peer-to-peer networks like BitTorrent and Skype and volunteer computing like SETI@home. The majority of cloud computing infrastructure currently consists of reliable services delivered through next-generation data centers that are built on computer and storage virtualization technologies. The services may be accessible anywhere in the world, with the Cloud appearing as a single point of access for all the computing needs of data consumers. Commercial offerings may need to meet the quality of service requirements of customers and may offer service level agreements. Open standards and open source software are also critical to the growth of cloud computing. As customers generally do not own the infrastructure, they are merely accessing or renting, they may forego capital expenditure and consume resources as a service, paying instead for what they use. Many cloud computing offerings have adopted the utility computing model which is analogous to how traditional utilities like electricity are consumed, while others are billed on a subscription basis. By sharing "perishable and intangible" computing power between multiple tenants, utilization rates may be improved (as servers are not left idle) which can reduce costs significantly while increasing the speed of application development. A side effect of this approach is that "computer capacity rises dramatically" as customers may not have to engineer for peak loads. Adoption has been enabled by "increased high-speed bandwidth" which makes it possible to receive the same response times from centralized infrastructure at other sites.

For the purposes of the present disclosure, the term "computer hardware" and the term "hardware" refer to the digital circuitry and physical devices of a computer system, as opposed to computer software, which is stored on a hardware device such as a hard disk. Most computer hardware is not seen by normal users, because it is embedded within a variety of every day systems, such as in automobiles, microwave ovens, electrocardiograph machines, compact disc players, and video games, among many others. A typical personal computer consists of a case or chassis in a tower shape (desktop) and the following parts: motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present disclosure, the term "computer network" refers to a group of interconnected computers. Networks may be classified according to a wide variety of characteristics. The most common types of computer networks in order of scale include: Personal Area Network (PAN), Local Area Network (LAN), Campus Area Network (CAN), Metropolitan Area Network (MAN), Wide Area Network (WAN), Global Area Network (GAN), Internetwork (intranet, extranet, Internet), and various types of wireless networks. All networks are made up of basic hardware building blocks to interconnect network nodes, such as Network Interface Cards (NICs), Bridges, Hubs, Switches, and Routers. In addition, some method of connecting these building blocks is required, usually in the form of galvanic cable (most commonly category 5 cable). Less common are microwave links (as in IEEE 802.11) or optical cable ("optical fiber").

For the purposes of the present disclosure, the term "computer software" and the term "software" refers to one or more computer programs, procedures and documentation that perform some tasks on a computer system. The term includes application software such as word processors which perform productive tasks for users, system software such as operating systems, which interface with hardware to provide the necessary services for application software, and middleware which controls and co-ordinates distributed systems. Software may include websites, programs, video games, etc. that are coded by programming languages like C, C++, Java, etc. Computer software is usually regarded as anything but hardware, meaning the "hard" are the parts that are tangible (able to hold) while the "soft" part is the intangible objects inside the computer. Computer software is so called to distinguish it from computer hardware, which encompasses the physical interconnections and devices required to store and execute (or run) the software. At the lowest level, software consists of a machine language specific to an individual processor. A machine language consists of groups of binary values signifying processor instructions which change the state of the computer from its preceding state.

For the purposes of the present disclosure, the term "computer system" refers to any type of computer system that implements software including an individual computer such as a personal computer, mainframe computer, minicomputer, etc. In addition, computer system refers to any type of network of computers, such as a network of computers in a business, the Internet, personal data assistant (PDA), devices such as a cell phone, a television, a videogame console, a compressed audio or video player such as an MP3 player, a DVD player, a microwave oven, etc. A personal computer is one type of computer system that typically includes the following components: a case or chassis in a tower shape (desktop) and the following parts: motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present disclosure, the term "convex analysis" refers to the branch of mathematics devoted to the study of properties of convex sets and convex functions.

For the purposes of the present disclosure, the term "convex function" refers to a real-valued function defined on an n-dimensional interval whose line segment between any two points on the graph of the function lies above or on the graph, in a Euclidean space (or more generally a vector space) of at least two dimensions. In addition, a function is convex if its epigraph (the set of points on or above the graph of the function) is a convex set. Well-known examples of convex functions include the quadratic function $x^2$ and the exponential function $e^x$. A function that does not comply with these requirements is non-convex.

For the purposes of the present disclosure, the term "convex set" refers to a subset of an affine space that is closed under convex combinations. More specifically, in a Euclidean space, a convex region is a region where, for every pair of points within the region, every point on the straight line segment that joins the pair of points is also within the region. For example, a solid cube is a convex set, but anything that is hollow or has an indent, for example, a crescent shape, is not convex. The boundary of a convex set is always a convex curve. The intersection of all convex sets containing a given subset A of Euclidean space is called the convex hull of A. It is the smallest convex set containing A.

For the purposes of the present disclosure, the term "data" means the reinterpretable representation of information in a formalized manner suitable for communication, interpretation, or processing. Although one type of common type data is a computer file, data may also be streaming data, a web service, etc. The term "data" is used to refer to one or more pieces of data.

For the purposes of the present disclosure, the term "data storage medium" or "data storage device" refers to any medium or media on which a data may be stored for use by a computer system. Examples of data storage media include floppy disks, Zip™ disks, CD-ROM, CD-R, CD-RW, DVD, DVD-R, memory sticks, flash memory, hard disks, solid state disks, optical disks, etc. Two or more data storage media acting similarly to a single data storage medium may be referred to as a "data storage medium" for the purposes of the present disclosure. A data storage medium may be part of a computer.

For the purposes of the present disclosure, the term "database management system (DBMS)" represents computer software designed for the purpose of managing databases based on a variety of data models. A DBMS is a set of software programs that controls the organization, storage, management, and retrieval of data in a database. DBMS are categorized according to their data structures or types. It is a set of prewritten programs that are used to store, update and retrieve a Database.

For the purposes of the present disclosure, the term "database" or "data record" refers to a structured collection of records or data that is stored in a computer system. The structure is achieved by organizing the data according to a database model. The model in most common use today is the relational model. Other models such as the hierarchical model and the network model use a more explicit representation of relationships (see below for explanation of the various database models). A computer database relies upon software to organize the storage of data. This software is known as a database management system (DBMS). Database management systems are categorized according to the database model that they support. The model tends to determine the query languages that are available to access the database. A great deal of the internal engineering of a DBMS, however, is independent of the data model, and is concerned with managing factors such as performance, concurrency, integrity, and recovery from hardware failures. In these areas there are large differences between products.

For the purposes of the present disclosure, the term "display device", "visual display defice", or "visual display apparatus" includes any type of visual display device or apparatus such as a CRT monitor, LCD screen, LEDs, a projected display, a printer for printing out an image such as a picture and/or text, etc. A visual display device may be a part of another device such as a computer monitor, television, projector, telephone, cell phone, smartphone, laptop computer, tablet computer, handheld music and/or video player, personal data assistant (PDA), handheld game player, head mounted display, a heads-up display (HUD), a global positioning system (GPS) receiver, automotive navigation system, dashboard, watch, microwave oven, electronic organ, automatic teller machine (ATM) etc.

For the purposes of the present disclosure, the term "filter" refers to a device or process that removes one or more components or features from a signal, such as an input signal. Within the context of signal processing, filtering completely or partial suppresses some aspect of a signal. Example filters include linear or non-linear, time-variant or time-invariant, causal or not-causal, analog or digital, discrete-time or continuous-time, passive or active, infinite impulse response or finite impulse response, and the like. A wave-form filter refers to a time-invariant filter described by the time-domain convolution of the input signal with a function whose value, calculated over time, resembles a wave-form when plotted coordinate-wise.

For the purposes of the present disclosure, the term "Hankel matrix" refers to a linear algebra concept of a square matrix in which each ascending diagonal from left to right is constant. Below is an example Hankel matrix:

$$\begin{bmatrix} a & b & c & d & e \\ b & c & d & e & f \\ c & d & e & f & g \\ d & e & f & g & h \\ e & f & g & h & i \end{bmatrix}$$

For purposes of the present disclosure, the term "hardware and/or software" refers to functions that may be performed by digital software, digital hardware, or a combination of both digital hardware and digital software. Various features of the present disclosure may be performed by hardware and/or software.

For the purposes of the present disclosure, the term "improper learning" refers to a computational and/or computer learning technique that is representation independent. A class of distributions C is learnable if, for example, for every $\varepsilon>0$ and $0<\phi<1$ for an unknown distribution $D \in C$, there exists a polynomial time algorithm A, called a learning algorithm of C, that outputs a generator or an evaluator of a distribution D'. If $D' \in C$, then A is a proper learning algorithm. Otherwise, A is an improper learning algorithm.

For the purposes of the present disclosure, the term "Internet" is a global system of interconnected computer networks that interchange data by packet switching using the standardized Internet Protocol Suite (TCP/IP). It is a "network of networks" that consists of millions of private and public, academic, business, and government networks of local to global scope that are linked by copper wires, fiber-optic cables, wireless connections, and other technologies. The Internet carries various information resources and services, such as electronic mail, online chat, file transfer and file sharing, online gaming, and the inter-linked hypertext documents and other resources of the World Wide Web (WWW).

For purposes of the present disclosure, the term "machine-readable medium" refers to any tangible or non-transitory medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" includes, but is limited to, solid-state memories, and optical and magnetic media. Specific examples of machine-readable media include non-volatile memory, including by way of example, semiconductor memory devices, e.g., EPROM, EEPROM, and flash memory devices; magnetic disks such as internal hard disks and removable disks; magneto-optical disks; and CD-ROM and DVD-ROM disks. The term "machine-readable medium" may include a single medium or multiple media (e.g., a centralized or distributed database, and/or associated caches and servers) that store the one or more instructions or data structures.

For the purposes of the present disclosure, the term "MEMS" refers to Micro-Electro-Mechanical Systems. MEMS, is a technology that in its most general form may be defined as miniaturized mechanical and electro-mechanical elements (i.e., devices and structures) that are made using the techniques of microfabrication. The critical physical dimensions of MEMS devices can vary from well below one micron on the lower end of the dimensional spectrum, all the way to several millimeters. Likewise, the types of MEMS devices can vary from relatively simple structures having no moving elements, to extremely complex electromechanical systems with multiple moving elements under the control of integrated microelectronics. A main criterion of MEMS may include that there are at least some elements having some sort of mechanical functionality whether or not these elements can move. The term used to define MEMS varies in different parts of the world. In the United States they are predominantly called MEMS, while in some other parts of the world they are called "Microsystems Technology" or "micromachined devices." While the functional elements of MEMS are miniaturized structures, sensors, actuators, and microelectronics, most notable elements may include microsensors and microactuators. Microsensors and microactuators may be appropriately categorized as "transducers," which are defined as devices that convert energy from one form to another. In the case of microsensors, the device typically converts a measured mechanical signal into an electrical signal.

For the purposes of the present disclosure, the term "neural network" refers to an artificial network of interconnected nodes modeled after biological neural networks. A neural network can include a number of various layers, such as an input layer, one or more hidden layers, and an output layer. In some examples, the interconnected nodes between layers, or in some implementations within a given layer, can include connections that are assigned weights. Neural networks can be "taught" to perform automated tasks using training data. For example, neural networks can learn tasks by progressively improving performance (e.g., improving statistical prediction) with some or no supervision. In some embodiments, neural networks can be trained, for example, to perform specifically related tasks such as related to computer vision (e.g., object recognition in images or video), speech recognition or machine translation (e.g., language processing), financial modeling, game theory, image processing such as in medical diagnostic and industrial process controls and other suitable disciplines.

For purposes of the present disclosure, the term "non-transient storage medium" refers to a storage medium that is non-transitory, tangible and computer readable. Non-transient storage medium may refer generally to any durable medium known in the art upon which data can be stored and later retrieved by data processing circuitry operably coupled with the medium. A non-limiting non-exclusive list of exemplary non-transitory data storage media may include magnetic data storage media (e.g., hard disc, data tape, etc.), solid state semiconductor data storage media (e.g., SDRAM, flash memory, ROM, etc.), and optical data storage media (e.g., compact optical disc, DVD, etc.).

For purposes of the present disclosure, the term "processor" refers to a device that performs the basic operations in a computer. A microprocessor is one example of a processor.

For the purposes of the present disclosure, the term "random-access memory (RAM)" refers to a type of computer data storage. Today it takes the form of integrated circuits that allow the stored data to be accessed in any order, i.e. at random. The word random thus refers to the fact that any piece of data can be returned in a constant time, regardless of its physical location and whether or not it is related to the previous piece of data. This contrasts with storage mechanisms such as tapes, magnetic discs and optical discs, which rely on the physical movement of the recording medium or a reading head. In these devices, the movement takes longer than the data transfer, and the retrieval time varies depending on the physical location of the next item. The word RAM is mostly associated with volatile types of memory (such as DRAM memory modules), where the information is lost after the power is switched off. However, many other types of memory are RAM as well, including most types of ROM and a kind of flash memory called NOR-Flash.

For the purposes of the present disclosure, the term "read-only memory (ROM)" refers to a class of storage media used in computers and other electronic devices. Because data stored in ROM cannot be modified (at least not very quickly or easily), it is mainly used to distribute firmware (software that is very closely tied to specific hardware, and unlikely to require frequent updates). In its strictest sense, ROM refers only to mask ROM (the oldest type of solid state ROM), which is fabricated with the desired data permanently stored in it, and thus can never be modified. However, more modern types such as EPROM and flash EEPROM can be erased and re-programmed multiple times; they are still described as "read-only memory" because the reprogramming process is generally infrequent, comparatively slow, and often does not permit random access writes to individual memory locations.

For the purposes of the present disclosure, the term "real-time processing" refers to a processing system designed to handle workloads whose state is constantly changing. Real-time processing means that a transaction is processed fast enough for the result to come back and be acted on as transaction events are generated. In the context of a database, real-time databases are databases that are capable of yielding reliable responses in real-time.

For the purposes of the present disclosure, the term "server" refers to a system (software and suitable computer hardware) that responds to requests across a computer network to provide, or help to provide, a network service. Servers can be run on a dedicated computer, which is also often referred to as "the server," but many networked computers are capable of hosting servers. In many cases, a computer can provide several services and have several servers running. Servers may operate within a client-server architecture and may comprise computer programs running to serve the requests of other programs—the clients. Thus, the server may perform some task on behalf of clients. The clients typically connect to the server through the network but may run on the same computer. In the context of Internet Protocol (IP) networking, a server is a program that operates as a socket listener. Servers often provide essential services across a network, either to private users inside a large organization or to public users via the Internet. Typical computing servers are database server, file server, mail server, print server, web server, gaming server, application server, or some other kind of server. Numerous systems use this client/server networking model including Web sites and email services. An alternative model, peer-to-peer networking may enable all computers to act as either a server or client as needed.

For the purposes of the present disclosure, the term "solid state sensor" refers to sensor built entirely from a solid-phase material such that the electrons or other charge carriers produced in response to the measured quantity stay entirely with the solid volume of the detector, as opposed to gas-discharge or electro-mechanical sensors. Pure solid-state sensors have no mobile parts and are distinct from electro-mechanical transducers or actuators in which mechanical motion is created proportional to the measured quantity.

For the purposes of the present disclosure, the term "solid-state electronics" refers to those circuits or devices built entirely from solid materials and in which the electrons, or other charge carriers, are confined entirely within the solid material. The term is often used to contrast with the earlier technologies of vacuum and gas-discharge tube devices and it is also conventional to exclude electro-mechanical devices (relays, switches, hard drives and other devices with moving parts) from the term solid state. While solid-state can include crystalline, polycrystalline and amorphous solids and refer to electrical conductors, insulators and semiconductors, the building material is most often a crystalline semiconductor. Common solid-state devices include transistors, microprocessor chips, and RAM. A specialized type of RAM called flash RAM is used in flash drives and more recently, solid state drives to replace mechanically rotating magnetic disc hard drives. More recently, the integrated circuit (IC), the light-emitting diode (LED), and the liquid-crystal display (LCD) have evolved as further examples of solid-state devices. In a solid-state component, the current is confined to solid elements and compounds engineered specifically to switch and amplify it.

For purposes of the present disclosure, the term "storage medium" refers to any form of storage that may be used to store bits of information. Examples of storage media include both volatile and non-volatile memories such as MRRAM, MRRAM, ERAM, flash memory, RFID tags, floppy disks, Zip™ disks, CD-ROM, CD-R, CD-RW, DVD, DVD-R, flash memory, hard disks, optical disks, etc. Two or more storage media acting similarly to a single data storage medium may be referred to as a "storage medium" for the purposes of the present disclosure. A storage medium may be part of a computer.

For the purposes of the present disclosure, the term "symmetric matrix" refers to a square matrix that is equal to its transpose. In other words, matrix A is symmetric if $A=A^T$. Transposition is a linear algebra concept that refers to the mirror image of a matrix that is reflected along its main diagonal. The above example of a Hankel matrix is also a symmetric matrix.

For the purposes of the present disclosure, the term "time" or "time series" refers to a component of a measuring system used to sequence events, to compare the durations of events and the intervals between them, and to quantify the motions of objects. Time is considered one of the few fundamental quantities and is used to define quantities such as velocity and other rates. An operational definition of time, wherein one says that observing a certain number of repetitions of one or another standard cyclical event (such as the passage of a free-swinging pendulum) constitutes one standard unit such as the second, has a high utility value in the conduct of both advanced experiments and everyday affairs of life. Temporal measurement has occupied scientists and technologists, and was a prime motivation in navigation and astronomy. Periodic events and periodic motion have long served as standards for units of time. Examples include the apparent motion of the sun across the sky, the phases of the moon, the swing of a pendulum, and the beat of a heart. Currently, the international unit of time, the second, is defined in terms of radiation emitted by cesium atoms. A time series input can be any sequence of events or other observable condition that occurs over time. For example, the movement of stock values, streaming video data, language processing flows, and other suitable observable occurrences are examples of time series inputs.

For the purposes of the present disclosure, the term "web service" refers to the term defined by the W3C as "a software system designed to support interoperable machine-to-machine interaction over a network". Web services are frequently just web APIs that can be accessed over a network, such as the Internet, and executed on a remote system hosting the requested services. The W3C Web service definition encompasses many different systems, but in common usage the term refers to clients and servers that communicate using XML messages that follow the SOAP standard. In such systems, there is often machine-readable description of the operations offered by the service written in the Web Services Description Language (WSDL). The latter is not a requirement of a SOAP endpoint, but it is a prerequisite for automated client-side code generation in many Java and .NET SOAP frameworks. Some industry organizations, such as the WS-I, mandate both SOAP and WSDL in their definition of a Web service. More recently, RESTful Web services have been used to better integrate with HTTP compared to SOAP-based services. They do not require XML messages or WSDL service-API definitions.

For the purposes of the present disclosure, the term "World Wide Web Consortium (W3C)" refers to the main international standards organization for the World Wide Web (abbreviated WWW or W3). It is arranged as a consortium where member organizations maintain full-time staff for the purpose of working together in the development of standards for the World Wide Web. W3C also engages in education and outreach, develops software and serves as an open forum for discussion about the Web. W3C standards include: CSS, CGI, DOM, GRDDL, HTML, OWL, RDF, SVG, SISR, SOAP, SMIL, SRGS, SSML, VoiceXML, XHTML+ Voice, WSDL, XACML, XHTML, XML, XML Events, Xforms, XML Information, Set, XML Schema, Xpath, Xquery and XSLT.

Description

While the disclosure is susceptible to various modifications and alternative forms, specific embodiment thereof has been shown by way of example in the drawings and will be described in detail below. It should be understood, however that it is not intended to limit the disclosure to the particular forms described, but on the contrary, the disclosure is to cover all modifications, equivalents, and alternatives falling within the spirit and the scope of the disclosure.

Embodiments relate to performing time series prediction by improper learning. FIG. 1 is a block diagram of a computer system 100 in accordance with exemplary embodiments. For example, system 100 can execute processes, methods, and algorithms disclosed to perform time series prediction by improper learning. As shown in FIG. 1, system 100 may include a bus device 112 and/or other communication mechanism(s) configured to communicate information between the various components of system 100, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth®, Wi-Fi, and/or cellular communications. Alternatively, communication device 120 may be configured to provide wired network connection(s), such as an Ethernet connection.

Processor 122 may include one or more general or specific purpose processors to perform computation and control functions of system 100. Processor 122 may include a single integrated circuit, such as a micro-processing device, or may include multiple integrated circuit devices and/or circuit boards working in cooperation to accomplish the functions of processor 122. In addition, processor 122 may execute computer programs, such as operating system 115, machine learning component modules 116, and other applications 118, stored within memory 114.

System 100 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for system 100. The modules can include an operating system 115, machine learning component modules 116 configured to perform machine learning according to the disclosed embodiments, as well as other applications modules 118. Operating system 115 provides operating system functionality for system 100. Dynamic user interface modules 116 may include software executables or application program interfaces ("APIs") that provide two-dimensional and/or three-dimensional graphical user interfaces for display, such as on display 124.

Non-transitory memory 114 may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with system 100.

In some embodiments, system 100 can be part of a larger system. Therefore, system 100 can include one or more additional functional modules 118 to include the additional functionality. A database 117 is coupled to bus 112 to provide centralized storage for modules 116 and 118 and to store, for example, data for dynamic display, such a hierarchical data set, and or any other suitable data. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, or any other database known in the art.

Although shown as a single system, the functionality of system 100 may be implemented as a distributed system. For example, memory 114 and processor 122 may be distributed across multiple different computers that collectively make up system 100. In one embodiment, system 100 may be part of a device (e.g., smartphone, tablet, computer, etc.), and system 100 may provide manipulation of dynamically rendered content of webpages.

In an embodiment, system 100 may be separate from the device, and may remotely provide the aforementioned functionality for the device. Further, one or more component of system 100 may not be included. For example, for functionality as a user or consumer device, system 100 may be a smartphone or other wireless device that includes a processor, memory, and a display, does not include one or more of the other components shown in FIG. 1, and includes additional components not shown in FIG. 1, such as an antenna, transceiver, or any other suitable wireless device component.

The modern context for LDS arose from the work of Kalman, who introduced the Kalman filter as a recursive least-squares solution for maximum likelihood estimation (MLE) of Gaussian perturbations to the system. The framework and filtering algorithm have proven to be a mainstay in control theory and time-series analysis; indeed, the term Kalman filter model is often used interchangeably with LDS.

Definition 2.1. A linear dynamical system (LDS) is a map from a sequence of input vectors $x_1, \ldots, x_T \in \mathbb{R}^n$ to output (response) vectors $y_1, \ldots, y_T \in \mathbb{R}^m$ of the form $$h_{t+1} = Ah_t + Bx_t + \eta_t \qquad (1)$$

$$y_t = Ch_t + Dx_t + \xi_t, \qquad (2)$$

where $h_0, \ldots, h_T \in \mathbb{R}^d$ is a sequence of hidden states, A, B, C, D are matrices of appropriate dimension, and $\eta_t \in \mathbb{R}^d$, $\xi_t \in \mathbb{R}^m$ are (possibly stochastic) noise vectors.

Unrolling this recursive definition gives the impulse response function, which represents and determines the LDS. For notational convenience, when $t<0$, $x_t$, $\eta_t$, and $\xi_t$ are defined to be the zero vector of appropriate dimension. Then, we have:

$$y_t = \sum_{i=1}^{T-1} CA^i(Bx_{t-i} + \eta_{t-i}) + CA^t h_0 + Dx_t + \xi_t. \qquad (3)$$

The (discrete) time derivative of the impulse response function, given by expanding $y_{t-1} - y_t$ by the above equation, is considered. In addition, embodiments consider two assumptions: The LDS is Lyapunov stable: $\|A\|_2 \leq 1$, where $\|A\|_2$ denotes the operator (e.g., spectral) norm; and the transition matrix A is symmetric and positive semidefinite. The first assumption is, in some implementations, a normal restriction, as when the hidden state is allowed to build exponentially, fine-grained prediction is futile. When narrowing the scope of implementations that comply with the second assumption, a number of useful applications remain. Symmetric LDSs constitute a natural class of linearly-observable, linearly-controllable systems with dissipating hidden states (e.g., physical systems with friction or heat diffusion). In addition, this assumption has been used successfully for video classification and tactile recognition tasks. In other embodiments, the disclosed algorithms are tolerant of some non-symmetric (and even nonlinear) transitions.

A natural formulation of system identification is that of online sequence prediction. At each time step t, an online learner is given an input $x_t$, and must return a predicted output $\hat{y}_t$. Then, the true response $y_t$ is observed, and the predictor suffers a squared-norm loss of $\|y_t - \hat{y}_t\|^2$. Over T rounds, the goal is to predict as accurately as the best LDS in hindsight. Note that the learner is permitted to access the history of observed responses $\{y_1, \ldots, y_{t-1}\}$. Even in the presence of statistical (non-adversarial) noise, the fixed maximum-likelihood sequence produced by $\Theta = (A, B, C, D, h_0)$ will accumulate error linearly as T. Thus, performance can be measured against a comparator which fixes LDS parameters $\Theta$, and predicts $y_t$ by the previous response $y_{t-1}$ plus the derivative of the impulse response function of $\Theta$. The disclosed algorithm that can compete against the best $\Theta$ in this setting. Let $\{\hat{y}_1, \ldots, \hat{y}_T\}$ be the predictions made by an online learner, and let $\{y^*_1, \ldots, y^*_T\}$ be the sequence of predictions realized by a chosen setting of LDS parameters $\Theta$, which minimizes total squared error. Then, we define regret by the difference of total squared-error losses:

$$\text{Regret}(T) \stackrel{\text{def}}{=} \sum_{t=1}^T \|y_t - \hat{y}_t\|^2 - \sum_{t=1}^T \|y_t - y^*_t\|^2.$$

This setup fits into the standard setting of online convex optimization (in which a sublinear regret bound implies convergence towards optimal predictions), save for the fact that the loss functions are non-convex in the system parameters. To quantify regret bounds, we state our scaling assumptions on the (otherwise adversarial) input and output sequences. We assume that each input vector is bounded: $\|x_t\|_2 \leq R_x$. Furthermore, we assume that the output signal is Lipschitz in time: $\|y_t - y_{t-1}\|_2 \leq L_y$. This can preclude certain inputs where an online learner incurs arbitrarily large regret; for a true noiseless LDS, this is not too large. We note that an optimal $\tilde{O}(\sqrt{T})$ regret bound can be achieved in this setting by algorithms such as Hedge, using an exponential-sized discretization of all possible LDS parameters. This is the online equivalent of brute-force grid search. The disclosed algorithms achieve essentially the same regret bound in polynomial time.

Convex relaxations can be leveraged to reduce the time complexity of this regret bound. However, the $CA^iB$ term in the least squares formula (or other potential formulas) causes the loss to be non-convex. Some methods attempt to use heuristic estimates of the hidden state, after which estimating the parameters becomes a convex linear regression problem, but these attempts have been unreliable in practice.

Embodiments leverage a paradigm of improper learning: in order to predict sequences as accurately as the best possible LDS $\Theta^* \in H$, a prediction need not come strictly from an LDS. Embodiments construct a slightly larger hypothesis class $\hat{H}$, for which the best predictor $\hat{\Theta}^*$ is nearly as good as $\Theta^*$. Embodiments also construct $\hat{H}$ so that the loss functions are convex under new parameterization. Based on these transformations, an efficient online algorithm is generated.

As an example, consider the following overparameterization: given some time window $\tau \ll T$, and given the predictions $\hat{y}_t$, as linear in the concatenation $[x_t, \ldots, x_{t-\tau}] \in \mathbb{R}^{\tau d}$ when $\|A\|$ is bounded away from 1. In a normal setting, this approximation is doomed to either truncate longer-term input-output dependences (short $\tau$), or suffer from over fitting (long $\tau$). Embodiments use overparameterization whose approximation factor $\varepsilon$ is independent of $\|A\|$, and whose sample complexity scales as $\tilde{O}$ (polylog(T/1/$\varepsilon$).

Some embodiments leverages the spectrum of a Hankel matrix, which is a square matrix whose anti-diagonal stripes have equal entries (e.g., $H_{ij}$ is a function of i+j). One example is a Hilbert matrix $H_{n,\Theta}$, the n-by-n matrix whose (i,j)-th entry is:

$$\frac{1}{i+j+\theta}$$

For example:

$$H_{3,-1} = \begin{bmatrix} 1 & 1/2 & 1/3 \\ 1/2 & 1/3 & 1/4 \\ 1/3 & 1/4 & 1/5 \end{bmatrix}$$

A basic fact is that $H_{n,\Theta}$ is a positive definite matrix for every $n \geq 1$; $\Theta > -2$. One property of interest is that the spectrum of a positive semidefinite Hankel matrix decays exponentially. These properties of a Hankel matrix, along with others, are further disclosed below.

Embodiments include an online algorithm that runs online projected gradient descent on the squared loss:

$$f_t(M_t) \stackrel{def}{=} \|y_t - \hat{y}_t(M_t)\|^2.$$

In this example, each $M_t$ is a matrix specifying a linear map from featured inputs $\tilde{X}_t$ to predictions $\hat{y}_t$. Specifically, after calculating a bank of k filters $\{\phi_j\}$, $\tilde{X}_t \in \mathbb{R}^{nk+2n+m}$ include convolutions of the input timer series each $\phi_j$ (scaled by certain constants), along with $x_{t-1}$, and $x_t$, and $y_{t-1}$. The number of filters k is polylogarithmic in time T.

The filters $\{\phi_j\}$ and scaling factors $\{\sigma_j^{1/4}\}$ are given by the top eigenvectors and eigenvalues of the Hankel matrix defined as $Z_T \in \mathbb{R}^{T \times T}$:

$$Z_{ij} := \frac{2}{(i+j)^3 - (i+j)}$$

One manner if considering the solutions is think of each $M_t$ as arising from $\tilde{O}$ (mn·polylog(T)+m²)-dimensional hypothesis class $\hat{H}$, which replaces $O$ ((m+n+d)2)-dimensional class H of LDS parameters (A, B, C, D, h₀). One example algorithm is:

---
Algorithm I Online ware-filtering algorithm
for LDS sequence prediction
---

1: Input: time horizon T, filter parameter k, learning rate η, radius parameter $R_M$.
2: Compute $\{\sigma_j, \sigma_j\}_{j=1}^k$, the top k eignenpairs of $Z_T$.

3: Initialize $M_1 \in \mathbb{R}^{m \times k'}$, where $k' \stackrel{def}{=} nk + 2n + m$.

4: for t = 1, . . . ,T do
5: Compute $\tilde{X} \in \mathbb{R}^{k'}$, with first nk entries $\tilde{X}_{(ij)} := \sigma_j^{1/4} \Sigma_{n=1}^{T-1} \phi_j(u)x_{t-u}(i)$, followed by the 2n + m entries of $x_{t-1}, x_t,$ and $y_{t-1}$.
6: Predict $\hat{y}_t := M_t \tilde{X}$.
7: Observe $y_t$. Suffer loss $\|y_t - \hat{y}_t\|^2$.
8: Gradient update: $M_{t+1} \leftarrow M_t - 2\eta (y_t - \hat{y}_t) \otimes \tilde{X}$.

9: if $\|M_{t+1}\|_F \geq R_M$ then

10: Perform Frobenins norm projection: $M_{t+1} \leftarrow \frac{R_M}{\|M_{t+1}\|_F} M_{t+1}$.

11: end if
12: end for

---

Figure 2A:
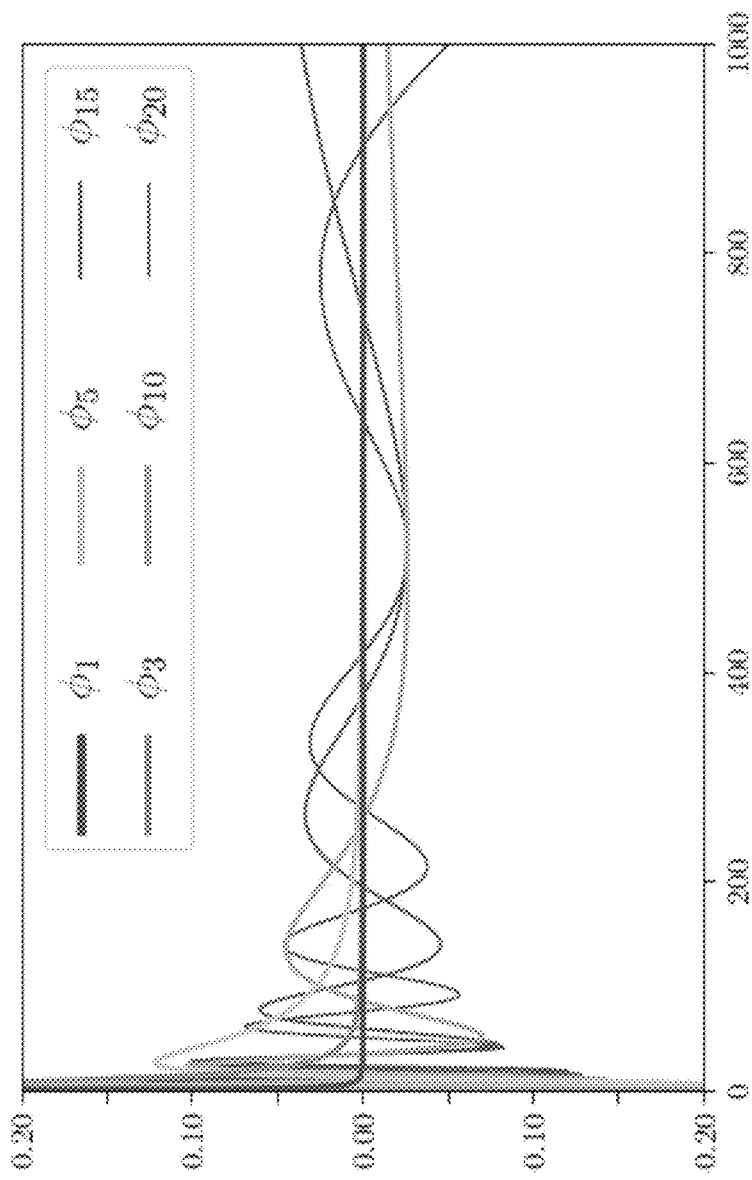
FIGS. 2A-2C are graphs showing coordinate-wise plots of calculated filters according to embodiments of the present disclosure.
Figure 2B:
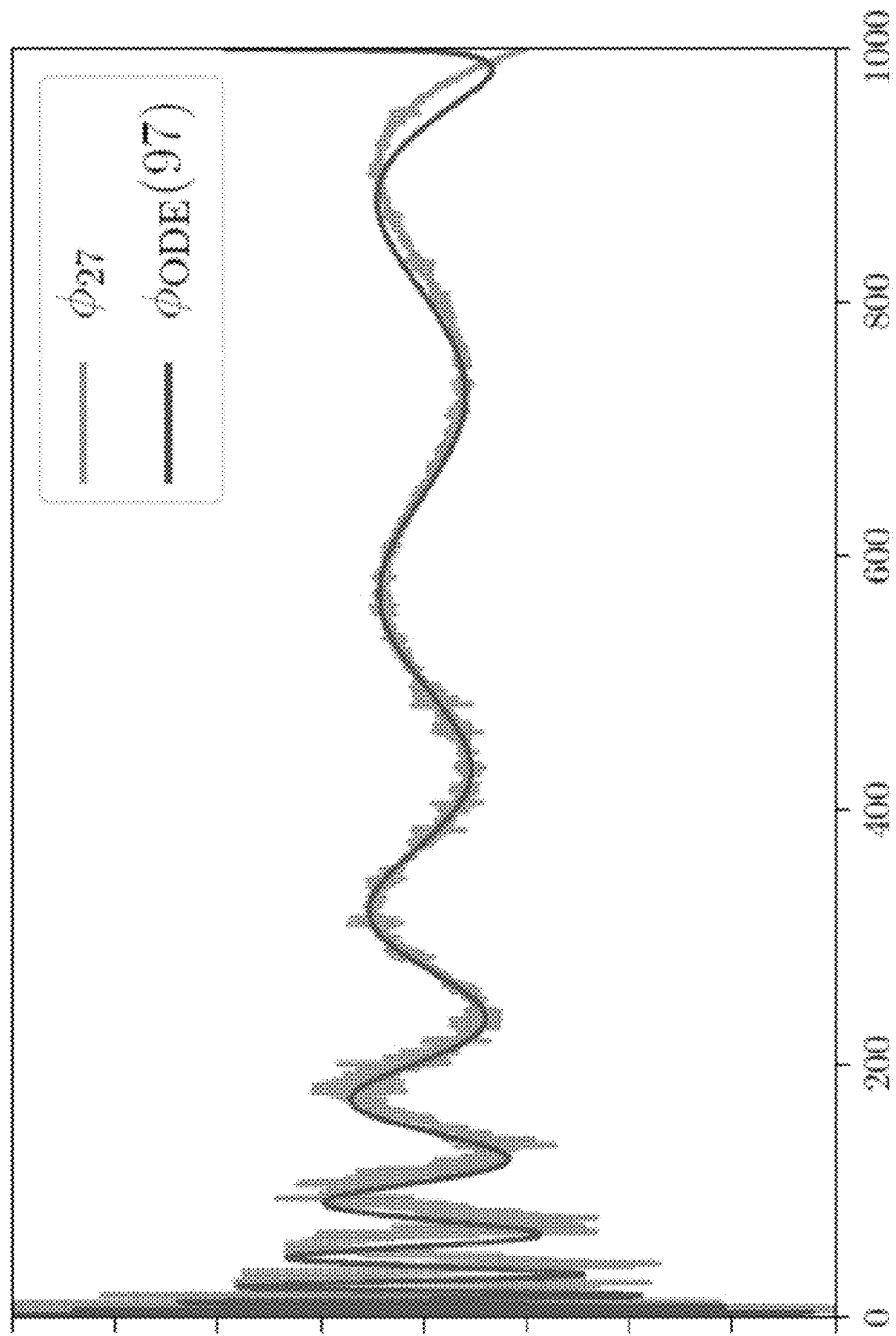
Figure 2C:
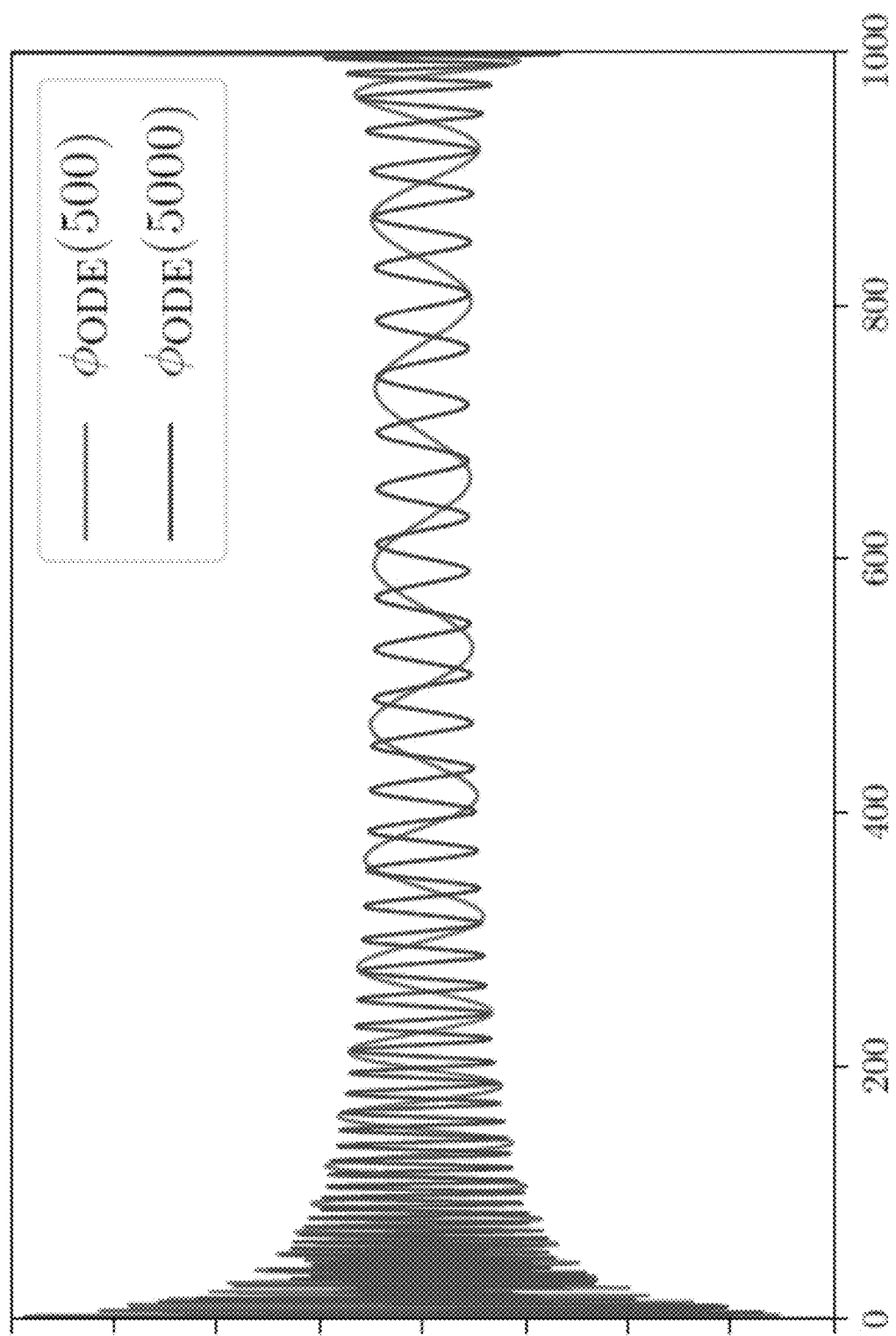

As detailed, embodiments of the disclosed algorithm achieves a favorable regret bound when compared to conventional approaches. One interesting note, from which the name wave-filtering arises: when plotted coordinate-wise, the computed filters look like vibrational modes of an inhomogeneous spring. FIGS. 2A-2C depict wave-forms of filters generated from a Hankel matrix in the manner disclosed plotted coordinate-wise over a continuous time interval. FIG. 2A depicts typical eigenvectors of $Z_{1000}$ plotted coordinate-wise over a time interval. FIG. 2B depicts $\phi_j$ of $Z_{1000}$ ($\sigma_{2\tau} \approx 10^{-16}$) computer with finite-precision arithmetic, along with a numerical solution to the $\phi$ODE(97) detailed below. FIG. 2C depicts some high-order filters $\phi$ODE(500) and $\phi$ODE(5000) that would be difficult to obtain by eigenvector computations.

In some embodiments, the scaling-limit linear map commutes with a certain second-order Sturm-Liouville differential operator D. This allows us to approximate filters with the eigenfunctions of D, using efficient numerical ordinary differential equation (ODE) solvers.

Expanding up the notion that the eigenvectors resemble inhomogeneously-oscillating waves, provided is a partial justification for the heuristic numerical computation of the top eigenvectors of $Z_T$. It would be defensible to ignore efficiency issues, and view this as a data-independent preprocessing step: these are deterministic filters. However, since this matrix is famously exponentially ill-conditioned, the stable construction of higher-order filters $\{\phi_j\}$ is a somewhat subtle matter that merits some attention.

In *Linear Algebra and its Applications*, 43:119-124, 1982, Grünbaum constructs a tridiagonal matrix $T_{n,\Theta}$ which commutes with each Hilbert matrix $H_{n,\Theta}$. In the appropriate scaling limit as this T becomes a Sturm-Liouville differential operator D which does not depend on $\Theta$, given by:

$$\mathcal{D} = \frac{d}{dx}\left((1-x^2)x^2 \frac{d}{dx}\right) - 2x^2$$

Notice that $Z_T = H_{T,-1} - 2H_{T,0} + H_{T,1}$. This suggests that large T the entries of $\phi_j$ are approximated by solutions to the second-order ODE. $\mathcal{D}\phi = \lambda\phi$. It is difficult to quantify theoretical bounds for this rather convoluted sequence of approximations; however, this observation greatly aids with constructing these filters in practice. In all, numerically stable recipe for computing filters is proposed (without a theorem): for each of k hand-selected eigenvalues λ, compute a filter $\phi_\lambda$ using an efficient numerical solver to solve $\mathcal{D}\phi = \lambda\phi$.

Returning to the topic regret, An example of a regret bound achieved by an embodiment of the disclosed algorithms is:

Theorem 1 (Main). On any sequence $\{(x_t, y_t)\}_{t=3}^T$, Algorithm 1, with a choice of k=Θ(log² T log($R_\Theta R_x L_y, n$)), $R_M$=Θ($R_\Theta^2 \sqrt{k}$), and η=Θ(($R_x^2 L_y$ log($R_{73} R_x L_y, n$)n$\sqrt{T}$ log⁴T)⁻¹), achieves regret Regret(T)≤$O(R_\Theta^3 R_x^2 L_y \log^2(R_\Theta R_x L_y, n) \cdot n\sqrt{T} \log^2 T)$, competing with LDS predictors (A, B, C, D, h₀) with $0 \preceq A \preceq I$ and $\|B\|_F, \|C\|_F, \|D\|_F, \|h_0\| \leq R_\Theta$.

Note that the dimensions m, n, d, do not appear explicitly in this bound, though they typically factor into $R_\Theta$. This allows us to approximate the optimal LDS in hindsight (the regret comparator) by the loss-minimizing matrix $M_t: \tilde{X} \mapsto \hat{y}_t$. Assume at this stage that $h_0 = 0$; this assumption will be removed at a later stage and the regret bound is asymptotically the same. Recall that regret measurement is compared to predictions obtained by adding the derivative of the impulse response function of an LDS Θ to $y_{t-1}$. Our approximation theorem states that for any $\Theta$, there is some $M_\Theta \in \hat{\mathcal{H}}$ which produces approximately the same predictions. Formally:

Theorem 3 (Spectral convex relaxation for symmetric (LDSs). Let $\{\hat{y}_t\}_{t=1}^T$ be the online predictions made by an LDS $\Theta=(A, B, C, D, h_0=0)$. Let $R_\Theta=\max\{\|B\|_F, \|C\|_F, \|D\|_F\}$. Then, for any $\varepsilon>0$, with a choice of $k=\Omega(\log T \log (R_\Theta R_x L_y nT/\varepsilon))$, there exists an $M_\Theta \in \mathbb{R}^{m \times k'}$ such that $$\sum_{t=1}^T \|M_\Theta \tilde{X}_t y_t\|^2 \leq \sum_{t=1}^T \|\hat{y}_t - y_t\|^2 + \varepsilon.$$

Here, k' and $\hat{X}_t$ are defined as in Algorithm 1 (noting that $\hat{X}_t$ includes the previous ground truth $y_{t-1}$).

Consider a mapping from $\Theta$ to $M_\Theta$:

$$[M^{(1)} M^{(2)} \ldots M^{(k)} M^{(x')} M^{(x)} M^{(y)}],$$

where the blocks' dimensions are chosen to align with $\hat{X}_t$, the concatenated vector $$[\sigma_1^{1/4}(X^*\phi_1)_t, \sigma_2^{1/4}(X^*\phi_2)_t \ldots \sigma_k^{1/4}(X^*\phi_k)_t \ldots_{t-1} x_t, y_{t-1}],$$

so that the prediction is the block matrix-vector product $$M_\Theta \overline{X}_i = \sum_{j=1}^k \sigma_j^{1/4} M^{(j)} (X * \phi_j)_i + M^{(x')} x_{t-1} + M^{(x)} x_t + M^{(y)} y_{i-1}.$$

Without loss of generality, assume that A is diagonal, with entries $\{\alpha_l\}_{l=1}^d$. Write the eigen decomposition $A=U\Lambda U^T$. Then, the LDS with parameters $(\hat{A}, \hat{B}, \hat{C}, D, h_0) := (\Lambda, BU, U^T C, D, h_0)$ makes the same predictions as the original, with $\hat{A}$ diagonal. Let $b_l$ be the l-th row of B, and $C_l$ the l-th column of C. Also, defined is a continuous family of vectors $\mu: [0, 1] \to \mathbb{R}^T$, with entries $\mu(\alpha)(i)=(\alpha_l-1)\alpha_l^{i-1}$.

Then, our construction is as follows:

$$M^{(j)} = \Sigma_{l=1}^d \sigma_j^{-1/4} \langle \phi_j, \mu(\alpha_l)\rangle (c_l \otimes b_l), \text{ for each } 1 \leq j \leq k$$
$$M^{(x')} = -D, M^{(x)} = CB+D, M^{(y)} = I_{m \times m}.$$

The following describes why $M_\Theta$ is effective. First, the instantaneous derivative predicted by $\Theta$ can be written as:

$$\hat{y}_t - y_{t-1} = (CB+D)x_t - Dx_{t-1} + \sum_{i=1}^{T-1} C(A^i - A^{i-1})Bx_{t-i} \quad (4)$$

$$= (CB+D)x_t - Dx_{t-1} + \sum_{i=1}^{T-1} C\left(\sum_{l=1}^d (\alpha_l^i - \alpha_l^{i-1}) e_l \otimes \varepsilon_l\right) Bx_{t-i}$$

$$= (CB+D)x_t - Dx_{t-1} + \sum_{l=1}^d (c_l \otimes b_l) \sum_{i=1}^{T-1} \mu(\alpha_l)(i) x_{t-i}.$$

Note that the inner sum is an inner product between the past inputs $(x_t, x_{t-1}, \ldots x_{t-T})$ and $\mu(\alpha_l)$ (or a convolution, view across the time horizon). $\mu(\alpha_l)$ can be approximated using the stated linear combination of filters $\{\phi_j\}_{j=1}^k$. Writing $Z := Z_T$ for short, note:

$$Z = \int_0^1 \mu(\alpha) \otimes \mu(\alpha) d\alpha,$$

Since the (i, j) entry of RHS is:

$$\int_0^1 (\alpha-1)^2 \alpha^{i+j-2} d\alpha = \frac{1}{i+j-1} - \frac{2}{i+j} + \frac{1}{i+j+1} = Z_{ij}$$

What follows is a spectral bound for reconstruction error, relying on the approximate rank of Z:

Lemma 4.1. Choose any $\alpha \in [0, 1]$. Let $\hat{\mu}(\alpha)$ be the projection of $\mu(\alpha)$ onto the k-dimensional subspace of $\mathbb{R}^T$ spanned by $\{\phi_j\}_{j=1}^k$. Then, $$\|\mu(\alpha) - \overline{\mu}(\alpha)\|^2 \leq \sqrt{6 \sum_{j=k+1}^T \sigma_j} \leq O(c_0^{-k/\log T} \sqrt{\log T}),$$

for an absolute constant $c_0 > 3.4$.

By construction of $M^{(j)}$, $M_\Theta \hat{X}_t$ replaces $\mu(\alpha_l)$ in equation (4) with its approximation $\hat{\mu}(\alpha_l)$. Hence, it is concluded that:

$$M_\Theta \overline{X}_t = y_{t-1} + (CB+D)x_t - Dx_{t-1} + \sum_{l=1}^d (c_l \otimes b_l) \sum_{i=1}^{T-1} \tilde{\mu}(\alpha_l)(i) x_{t-i}$$

$$= y_{t-1} + (\hat{y}_t - y_{t-1}) + \zeta_t = \hat{y}_t + \zeta_t,$$

Letting $\{\zeta_t\}$ denote some residual vectors arising from discarding the subspace of dimension T−k. Theorem 3 follows by showing that these residuals are small, using Lemma 4.1: it turns out that $\|\zeta_t\|$ exponentially small in k/log T, which implies the theorem.

The following demonstrates Lemma 4.1. First, we develop a spectral bound for average reconstruction error of $\mu(\alpha)$. This can be viewed as the average error when is drawn from Unif ([0, 1]), thus controlled by the tail eigenvalues, as in PCA:

Lemma C.1. Let $\{(\sigma_j, \phi_j)\}_{j=1}^T$ be the eigenpairs of Z, in decreasing order by eigenvalue. Let $\Psi_k$ be the linear subspace of $\mathbb{R}^T$ spanned by $\{\phi_1, \ldots, \phi_k\}$. Then, $$\int_0^1 \|\mu(\alpha) - \text{Proj}_{\phi_k}(\alpha)\|^2 d\alpha \leq \sum_{j=k+1}^T \sigma_j.$$

Proof. Let $r(\alpha)$ denote the residual $\mu(\alpha) - \text{Proj}_{\Psi_k}(\alpha)$, and let $U_r \in \mathbb{R}^{T \times r}$ whose columns are $\phi_1, \ldots \phi_r$, so that $$r(\alpha) = \Pi_r \mu(\alpha) := (I - U_r U_r^T) \mu(\alpha).$$

Write the eigen decomposition $Z_T = U_T \Sigma U_T^T$. Then, $$\int_0^1 \|r(\alpha)\|^2 d\alpha = \int_0^1 Tr(r(\alpha) \otimes r(\alpha)) d\alpha \int_0^1 Tr(\Pi_r \mu(\alpha) \mu(\alpha)^T \Pi_r) d\alpha$$

$$= \int_0^1 Tr(\Pi_r Z \Pi_r) d\alpha = \int_0^1 Tr(\Pi_r U_T \Sigma U_T^T \Pi_r) d\alpha.$$

Noting that $\Pi_r U_T$ is just $U_T$ with the first r columns set to zero, the integrand becomes $\Sigma_{j=k+1}^T \Sigma_{jj}$, which is the stated bound. In fact, this bound in expectation turns into a bound for all $\alpha$. It will be shown that $\|r(\alpha)\|^2$ is Lipshitz in $\alpha$, so its maximum over $\alpha \in [0, 1]$ cannot be too much lager than its mean.

Lemma C.2. For all $\alpha \in [0, 1]$, it holds that $$\|r(\alpha)\|^2 \le \sqrt{6 \sum_{j=k+1}^{T} \sigma_j}.$$

It will be demonstrated that $\|\mu(\alpha)\|^2$ is 3-Lipschitz; since $\Pi_r$ is contractive, $\|r(\alpha)\|^2$ is also 3-Lipschitz. Subject to achieving a maximum at R, the non-negative 3-Lipschitz function $g:[0, 1] \to \mathbb{R}$ with the smallest mean is given by the triangle-shaped function:

$\Delta(\alpha) = \max(R - 3\alpha, 0),$ for which $\int_0^1 \Delta(\alpha) d\alpha = R^2/6.$ In other words, $R^2/6 \le \int_0^1 \|r(\alpha)\|^2 d\alpha.$ But Lemma C.1 gives a bound on the RHS, so we conclude $$\max_{\alpha \in [0,1]} \|r(\alpha)\|^2 \le R \le \sqrt{6 \sum_{j=k+1}^{T} \sigma_j}.$$

Thus, the stated upper bound comes from a bound of this spectral tail of the Hankel matrix $Z_t$ (see Lemmas E.2 and E.3 later disclosed).

It remains to apply Lemma 4.1 to the original setting, which will complete the low-rank approximation results of Theorem 3. Above, Lemma 4.1 gave:

$$\zeta_t \stackrel{def}{=} M_\Theta \tilde{X}_t - \hat{y}_t = \sum_{l=1}^{d} (c_l \otimes b_l) \sum_{i=1}^{T-1} [\tilde{\mu}(\alpha_l) - \mu(\alpha_l)](i) \cdot x_{t-i}.$$

View each of the n coordinates in the inner summation as an inner product between the length-T sequence $\tilde{\mu}(\alpha_l) - \mu(\alpha_l)$ and coordinates $X(j) := (x_1(j), \ldots x_T(j))$ which are entry wise bounded by $R_x$. Then, by Holder's inequality and Lemma 4.1, it can been seen that this inner product has an absolute value at most:

$\|X(j)\|_\infty \|\tilde{\mu}(\alpha_l) - \mu(\alpha_l)\|_1 \le \|X(j)\|_\infty \sqrt{T} \|\tilde{\mu}(\alpha_l) - \mu(\alpha_l)\|_2 \le O(R_x \sqrt{T} \cdot c_1^{-k/\log T} \log^{1/4} T)$ with $c_1 = \sqrt{c_0}$.

There are n such coordinates, so this inner summation is a vector with $l_2$ norm at most:

$O(R_x \sqrt{nT} \cdot c_1^{-k/\log T} \log^{1/4} T).$

Thus, in all, we have $\|\zeta_t\|_2 \le O(\|B\|_F \|C\|_F R_x \sqrt{nT} c_1^{-k/\log T} \log^{1/4} T)$ In summary, we have shown that for every system $\Theta$ from which a predictor for the discrete derivative of the LDS arises, there is some $M_\Theta$ whose predictions are pointwise $\|\zeta_t\|_2^{-close}$. This residual bound can be driven down exponentially by increasing k (the number of filters). Finally, to get an inequality on the total squared error, we compute:

$$\sum_{t=1}^{T} \|M_\Theta \tilde{X}_t - y_t\|^2 = \quad (6)$$

-continued $$\sum_{t=1}^{T} \|\hat{y}_t - y_t + \zeta_t\|^2 \le \sum_{t=1}^{T} (\|\hat{y}_t - y_t\|^2 + \|\zeta_t\|^2 + 2\|\hat{y}_t - y_t\|\|\zeta_t\|) \le$$

$$\sum_{t=1}^{T} \|\hat{y}_t - y_t\|^2 + O((R_\Theta^4 R_x^2 L_y^2 k) T^{3/2} n^{1/2} \cdot c_1^{-k/\log T} \log^{1/4} T), \le$$

$$\sum_{t=1}^{T} \|\hat{y}_t - y_t\|^2 + O((R_\Theta^4 R_x^2 L_y^2 T^{5/2} n^{1/2} \cdot c_1^{-k/\log T} \log^{1/4} T).$$

Where inequality (6) invokes Corollary D.2. Thus, in all, it suffices to choose:

$$\frac{k}{\log T} \ge \Omega\left(\log \frac{R_\Theta R_x L_y nT}{\varepsilon}\right)$$

to force $O(\bullet)$ the term to be less than $\varepsilon$, noting that the power of n and T show up as a constant factor in from of the $\log(\bullet)$.

It can also be shown that the achieved approximate relaxation provides low regret. Let $\Theta \in \mathcal{H}$ denoted the disclosed LDS predictor, and let $M_\Theta \in \hat{\mathcal{H}}$ be its image under the map from Theorem 3, so that the total squared error of prediction $M_\Theta \cdot \tilde{X}_t$ within $\varepsilon$ from that of $\Theta^*$. Notice that the loss functions $$f_t(M) \stackrel{def}{=} \|y_t - M \tilde{X}_t\|^2$$

are quadratic in M, and thus convex. Algorithm 1 can run an online gradient descent on these loss functions, with decision set $$\mathcal{M} \stackrel{def}{=} \{M \in R^{m \times k'} \mid \|M\|_F \le R_M\}.$$

Let $D_{max} := \sup_{M, M' \in \mathcal{M}} \|M - M'\|_F$ be the diameter of M, and $G_{max} := \sup_{M \in \mathcal{M}, \tilde{X}} \|\nabla f_t(M)\|_F$ be the largest norm of a gradient. We can invoke the classic regret bound:

Lemma 4.1 Online gradient descent, using learning rule $$\frac{D_{max}}{G_{max} \sqrt{T}};$$

has regret $$Regret_{OGD}(T) \stackrel{def}{=} \sum_{t=1}^{T} f_t(M_t) - \min_{M \in \mathcal{M}} \sum_{t=1}^{T} f_t(M) \le 2 G_{max} D_{max} \sqrt{T}$$

To conclude Theorem 1, it remains to show that $D_{max}$ and $G_{max}$ are small. In particular, since the gradients contain convolutions of the input by $l_2$ (not $l_1$) unit vectors, special care must be taken to ensure that these do not grow too quickly; a matrix perturbation approach is taken.

It is shown that the $M_\Theta$ that competes with a system $\Theta$ is not too much larger than $\Theta$, justifying the choice of $R_M = \Omega(R^2_\Theta \sqrt{k})$. Of course, this implies that the diameter term in the regret bound is $D_{max} = 2R_M$. Concretely:

Lemma D.1. For any LDS parameters $\Theta=(A, B, C, D, h_0=0)$ with $0 \preccurlyeq A \preccurlyeq I$ and $\|B\|_F, \|C\|_F, \|D\|_F, \|h_0\| \leq R_\Theta$, the corresponding matrix $M_\Theta \in \tilde{\mathcal{H}}$ (which realizes the relaxation in Theorem 3) satisfies $$\|M_\Theta\|_F^2 \leq O(R_\Theta^2 \sqrt{k}).$$

Proof. Recalling our construction $M_\Theta$ in the proof of Theorem 3, we have
$\|M^{(j)}\|_F \leq \|B\|_F \|C\|_F \cdot \max_{l \in [k]} \sigma^{-1/4}(\phi_j, \mu(\alpha_l))$, for each $1 \leq j \leq k$.
$\|M^{(x')}\|_F = \|D\|_F \leq O(R_\Theta)$.
$\|M^{(x)}\|_F \leq \|B\|_F \|C\|_F + \|D\|_F \leq O(R_\Theta^2)$.

Recall that we do not consider $M^{(y)}$ as part of the online learning algorithm; it is the identity matrix in this example. Thus, for the purposes of this analysis, it does not factor into regret bounds. In Lemma E.4, we show that the reconstruction coefficients are bounded by an absolute constant; thus, those matrices each have Frobenius $O(R_\Theta^2)$. These terms dominate the Frobenius norm of the entire matrix, concluding the lemma. This has a very useful consequence:

Corollary D.2. The predictions $\hat{y}_t = MX_t$ made by choosing $M$ such that $\|M\|_F \leq O(R_\Theta^2)$ satisfy $$\|\hat{y}_t - y_t\|^2 \leq O(R_\Theta^4 R_x^2 L_y^2 k).$$

A subtle issue remains: the gradients may be large, as they depend on $\tilde{X}_t$, defined by convolutions of the entire input time series by some filters $\phi_j$. Note that these filters do not preserve mass: they are $l_2$ unit vectors, which may cause the norm of the part of $\tilde{X}_t$ corresponding to each filter to be as large as $\sqrt{T}$. Fortunately, this is not the case. Indeed, we have:

Lemma D.3. Let $\{(\sigma_j, \phi_j)\}_{j=1}^T$ be the eigenpairs of $Z$, in decreasing order by eigenvalue. Then, for each $1 \leq j, t \leq T$, it holds that $$\|\sigma^{1/4}(\phi_j * X)_t\|_\infty \leq O(R_x \log T).$$

Each coordinate of $(\sigma^{1/4} \phi_j * X)_t$ is the inner product between $\phi_j$ and a sequence of $T$ real numbers, entrywise bounded by $\sigma_j^{1/4} R_x$. Corollary E.6 shows that this is at most $O(\log T)$, a somewhat delicate result which uses matrix perturbation.

Thus, $\tilde{X}_t$ has $nk$ entries with absolute value bounded by $O(R_x \log T)$, concatenated with $x_t$ and $x_{t-1}$. This results in:

Corollary D.4. Let $X_t$ be defined as in Algorithm 1, without the $y_{t-1}$ portion. Then, $$\|\tilde{X}_t\|_2 \leq O(R_x \log T\sqrt{nk}).$$

The bound on the gradient follows:

Lemma D.5. Suppose $\mathcal{M}$ is chosen with diameter $O(R_\Theta^2)$. Then, the gradients satisfy $$G_{max} \stackrel{def}{=} \max_{\substack{M \in \mathcal{M} \\ 1 \leq t \leq T}} \|\nabla f_t(M)\|_F \leq O(R_\Theta^2 R_x^2 L_y \cdot nk^{3/2} \log^2 T).$$

Proof. We compute the gradient, and apply Lemma D.3:

$$\nabla f_t(M) = \nabla (\|y_t - M\tilde{X}_t\|^2) = 2(M\tilde{X}_t - y) \otimes \tilde{X}_t,$$

so that $\|\nabla f_t(M)\|_F = 2\|M\tilde{X}_t - y_t\|_2 \cdot \|\tilde{X}_t\|_2 \leq 2(\|M\|_F \|\tilde{X}_t\|_2 + L_y) \|\tilde{X}_t\|_2 \leq 2$
$((R_\Theta^2 \sqrt{k})(R_x \log T\sqrt{nk}) + L_y)(R_x \log T$
$\sqrt{nk}) \leq O(R_\Theta^2 R_x^2 L_y \cdot nk^{3/2} \log^2 T),$ as desired.

Using Lemma 4.2 and collecting the terms from Lemma D.1 and D.5 results in:

$$D_{max} G_{max} = O(R_\Theta^2 \sqrt{k}) \cdot O(R_\Theta^2 R_x^2 L_y \cdot nk^{3/2} \log^2 T)$$
$$= O(R_\Theta^4 R_x^2 L_y nk^2 \log^2 T).$$

To compete with systems with parameters bounded by $R_\Theta$, in light of Theorem 3, an example $k$ can be chosen to be $\Theta(\log^2 T \log(R_x L_y R_\Theta n))$. It suffices to set the relaxation approximation error to $\varepsilon$ to be a constant; in the online case, this is not the bottleneck of the regret bound. In all, the regret bound from online gradient descent is:

$$\text{Regret}(T) \leq O(R_\Theta^4 R_x^2 L_y \log^2(R_\Theta R_x L_y n) \cdot n\sqrt{T} \log^6 T)$$

as disclosed.

The above demonstrates the regret of Algorithm 1 in comparison with the comparator $M^* \in \tilde{\mathcal{H}}$. By Theorem 3, $M^*$ competes arbitrarily closely with the best LDS in hindsight, yielding the theorem.

Also, it is discussed why it is possible to relax the earlier assumption $h_0=0$ on the initial hidden state. Intuitively, as more of the ground truth responses $\{y_t\}$ are revealed, the largest possible effect of the initial state decays. It is shown that that a comparator who chooses a nonzero $h_0$ can only increase the regret by an additive $\tilde{O}(\log^2 T)$ in the online setting.

In particular, it is shown that $h_0$ is not significant in this online setting, thereby proving a slightly more general result. Throughout this portion of the analysis, we considered the comparator $\Theta^*$, which forces the initial hidden state to be the zero vector. We will show that this does not make much worse predictions than $\Theta^{**}$, which is allowed to set $\|h_0\|_2 \leq R_\Theta$. This is quantified below:

Lemma D.6. Relaxing the condition $h_0=0$ for the comparator in Theorem 1 increases the regret (additively) by at most $$O(R_\Theta^4 R_x L_y \log(R_\Theta R_x L_y \Omega) \log^2 T).$$

Initially, an intuitive sketch: Lemma F.1 states that for any $\alpha$, there is an "envelope" bound $\mu(\alpha)(t) \leq 1/t+1$. This means that the influence of $h_0$ on the derivative of the impulse response function decays as $1/t$. Thus, we can expect the total "loss of expressiveness" caused by forcing $h_0=0$ to be only logarithmic in $T$. Indeed, with a nonzero initial hidden state, we have:

$$\hat{y}_t - y_{t-1} = (CB+D)x_t - Dx_{t-1} + \sum_{i=1}^{T-1} C(A^i - A^{i-1})Bx_{t-i} + C(A^t - A^{t-1})h_0$$

Let $\hat{y}_1, \ldots, \hat{y}_T$ denoted the predictions made by an LDS $\Theta^{**}$ $(A, B, C, D, h_0)$ whose $\hat{y}_1^0, \ldots, \hat{y}_T^0$ denote the predictions made by the LDS with the same $(A, B, C, D,)$ but $h_0$ set to 0. Then we have:

$$\|\hat{y}_t - \hat{y}_t^0\| = \|C(A^t - A^{t-1})h_0\| = \left\|\sum_{i=1}^T C[\mu(\alpha_t)(t) \cdot e_i \otimes e_i]h_0\right\| \leq \frac{\|C\|_F \|h_0\|\sqrt{n}}{t} \leq \frac{R_\Theta^2 \sqrt{n}}{t}.$$

Thus we have, for vectors $\mu_t$ satisfying $\|\mu_t\| \leq R_\Theta^2/t$:

$$\sum_{t=1}^T \|\hat{y}_t^\theta - \hat{y}_t\|^2 =$$

-continued $$\sum_{t=1}^{T} \|\hat{y}_t + u_t - y_t\|^2 \le \sum_{t=1}^{T} \|\hat{y}_t - y_t\|^2 + \|u_t\|^2 + 2\|\hat{y}_t - y_t\| \|u_t\| \le$$

$$\sum_{t=1}^{T} \|\hat{y}_t - y_t\|^2 + O(R_\Theta^4 n) + O\left(\left(R_\Theta^2 R_x L_y \sqrt{k}\right) \cdot R_\Theta^2 \sqrt{n} \log T\right) \le$$

$$\sum_{t=i}^{T} \|\hat{y}_t - y_t\|^2 + O(R_\Theta^4 R_x L_y \log(R_\Theta R_x L_y n) n \log^2 T),$$

where the inequalities respectively come from Cauchy-Schwarz, Lemma F.1, and Lemma D.2. In other words, strengthening the comparator by allowing a nonzero $h_0$ does little to improve the asymptotic regret bound from Theorem 1.

Turning to the properties of the Hankel Matrix $Z_T$, technical lemmas are presented about the family of entries given by:

$$Z_{ij} = \frac{2}{(i+j)^3 - (i+j)}$$

To show the spectral tail bounds detailed herein, the following low-approximation rank property of positive semidefinite Hankel matrices are considered:

Lemma E.1 Let $H_n$ be a Hankel matrix of dimension n. Then, $$\sigma_{j+2k}(H_n) \le 16 \left[\exp\left(\frac{\pi^2}{4 \log(8\lfloor n/2 \rfloor/\pi)}\right)\right]^{-2k+2} \sigma_j(H_n)$$

Note that the Hankel matrix $Z_T$ is indeed positive semidefinite, because it was constructed as:

$Z = \int_0^1 \mu(\alpha) \otimes \mu(\alpha) d\alpha$ for certain $\mu(\alpha) \in \mathbb{R}^T$ Also note that at no point is it relied upon that $Z_T$ be positive definite or have all distinct eigenvalues, although both seem to be true. This first result shown in the exponential decay of the tail spectrum of Z.

Lemma E.2. Let $\sigma_j$ be the j-th top singular value of $Z := Z_T$. Then, for all $T \ge 10$, we have $$\sigma_j \le \min\left(\frac{3}{4}, K \cdot c^{-j/\log T}\right),$$

where $c = e^{\pi^2/4} \approx 11.79$, and $K < 10^6$ is an absolute constant.

Proof. We begin by noting that for all j, $$\sigma_j \le Tr(Z) = \sum_{i=1}^{T} \frac{1}{(2i)^3 - 2i} < \sum_{i=1}^{\infty} \frac{1}{4i^3} < \frac{3}{4}$$

Now, since $T \ge 10$ implies $8\lfloor T/2 \rfloor/\pi > T$, we have $$\sigma_{2+2k} \le \sigma_{1+2k} < 12 \cdot \left[\exp\left(\frac{\pi^2}{2 \log T}\right)\right]^{-k+1} < 1680 \cdot c^{-2k/\log T}.$$

Thus, we have that for all j, $$\sigma_j < 1680 \cdot c^{-(j-2)/\log T} < 235200 \cdot c^{-j/\log T},$$

A slightly stronger claims is also considered, that all spectral gaps are large.

Lemma E.3. Let $\sigma_j$ be the j-th top singular value of $Z := Z_T$. Then, if $T \ge 60$, we have $$\sum_{j' > j} \sigma_{j'} < 400 \log T \cdot \sigma_j.$$

Proof. For convenience, define $\sigma_j := 0$ when $j \ge T$. Picking k=4 and using Lemma E.1, we have $$\beta_j := \sum_{q=1}^{T} \sigma_{j+4q} < 16\sigma_j \sum_{q=1}^{\infty} \left[\exp\left(\frac{-\pi^4}{4 \log T}\right)\right]^q = 16\sigma_j \cdot \frac{1}{1 - \exp\left(\frac{-\pi^4}{4 \log T}\right)}$$

where the last inequality follows from the fact that $$\frac{1}{1 - e^{-x}} < \frac{6}{x}$$

whenever x<6, and setting $$x := \frac{-\pi^4}{4 \log T} \le \frac{-\pi^4}{4 \log 60} < 6.$$

Thus, we have $$\sum_{j' > j} \sigma_{j'} = \beta_j + \beta_{j+1} + \beta_{j+2} + \beta_{j+3} < 4\beta_j < 400 \log T \cdot \sigma_j,$$

With regard to the decaying reconstruction of coefficients, to show the bound on entries of $M_\Theta$, the following property of $Z_T$ is considered:

Lemma E.4. For any $0 \le \alpha \le 1$ and $1 \le j \le T$, we have $|\langle \phi_j, \mu(\alpha) \rangle| \le 6^{1/4} \sigma_j^{1/4}.$ Proof. We have $$\int_0^1 \langle \phi_j, \mu(\alpha) \rangle^2 d\alpha = \int_0^1 \phi_j^T (\mu(\alpha) \otimes \mu(\alpha)) \phi_j$$

$$= \phi_j^T Z_T \phi_j = \sigma_j.$$

Thus, a bound on the expectation of the squared coefficient is shown, when $\alpha$ is drawn uniformly from [0, 1]. Next, since $\|\mu(\alpha)\|^2$ is 3-Lipschitz in $\alpha$, so is $\langle \phi_j, \mu(\alpha) \rangle^2$. Thus, it holds that:

$$\max_{\alpha \in [0,1]} \langle \phi_j, \mu(\alpha) \rangle^2 \le \sqrt{6\sigma_j},$$

In addition, to bound the size of convolutions, the $l_1$ norms of the eigenvectors $\phi_j$ can be controlled with a tighter bound than $\sqrt{T}$. Considering the more general result, bonding the $l_2 \to l_1$ subordinate norm of $Z^{1/4}$:

Lemma E.5. Let $Z := Z_T$. Then, for every $T>0$, and $v \in \mathbb{R}^n$ with $\|v\|_2 = 1$, we have $$\|Z^{1/4} v\|_1 \leq 2 + 2 \log_2 T.$$

Consider the following steps:

(i) Start with a constant $T_0$; the subordinate norm of $Z_{T_0}$ is clearly bounded by a constant.

(ii) Argue that doubling the size of the matrix ($T \mapsto 2T$) comprises only a small perturbation, which will only affect the eigenvalues of the matrix by a small amount. This will show up in the subordinate norm as an additive constant.

(iii) Iterate the doubling argument $O(\log T)$ times to reach $Z_T$ from $Z_{T_0}$, to conclude the lemma.

A non-trivial step above is (ii). Consider the doubling step from T to 2T. Let Z denoted the 2T-by-2T matrix which has $Z_T$ as its upper left T-by-T submatrix, and zero elsewhere. Let Z' denote $Z2_T$, and call E–Z'–Z, which can be interpreted as the matrix perturbation associated with doubling the size of the Hankel matrix. Notice that when $T \geq 2$, E is entrywise bounded by $$\frac{2}{(T+2)^3 - (T+2)} \leq \frac{2}{T^3},$$

which can be called $e_{max}$ for short. Then $\|E\|_{op}$ is at most $$T e_{max} \leq \frac{2}{T^2}.$$

Hence, by the generalized Mirsky inequality (setting $f(x) = x^{1/4}$), there exists a bound on how much E pertubs the fourth root of Z:

$$\|Z^{1/4} - Z'^{1/4}\|_2 \leq \|E\|_2^{1/4} \leq \left(\frac{2}{T^2}\right)^{1/4} < \frac{2}{\sqrt{T}}.$$

Thus we have $$\begin{aligned}
\|Z'^{1/4}\|_{2 \to 1} &\leq \|Z^{1/4}\|_{2 \to 1} + \|Z^{1/4} - Z'^{1/4}\|_{2 \to 1} \\
&\leq \|Z^{1/4}\|_{2 \to 1} + \sqrt{T} \cdot \|Z^{1/4} - Z'^{1/4}\|_2 \\
&\leq \|Z^{1/4}\|_{2 \to 1} + \sqrt{T} \cdot \frac{2}{\sqrt{T}} \\
&= \|Z^{1/4}\|_{2 \to 1} + 2.
\end{aligned}$$

Thus, doubling the dimension increases the subordinate norm by at most a constant. Consider $T_0 = 2$, for which it holds:

$$\|Z_2^{1/4}\|_{2 \to 1} < \sqrt{2} \|Z_2^{1/4}\|_F < \sqrt{2} \|Z_4\|_F < 2.$$

Noting that the norm is clearly monotonic in T, we repeat the doubling argument $\lfloor \log_2 T \rfloor$ times, so that;

$$\|Z_T^{1/4}\|_{2 \to 1} \leq \|Z_{2 \cdot 2\lfloor \log_2 T \rfloor}^{1/4}\|_{2 \to 1} < \|Z_2^{1/4}\|_{2 \to 1} + 2\lfloor \log_2 T \rfloor < 2 + 2 \log_2 T.$$

An alternate form is:

Corollary E.6. Let $(\sigma_j, \phi_j)$ be the j-th largest eigenvalue-eigenvector pair of Z. Then, $$\|\phi_j\|_1 \leq O\left(\frac{\log T}{\sigma_j^{1/4}}\right).$$

Another aspect of the disclosed algorithm relates to the vector $\mu(\alpha)$. Recall that $\mu(\alpha) \in \mathbb{R}^T$ is defined as the vector whose i-th entry is $(1-\alpha)\alpha^{i-1}$. Here, various properties of $\mu(\alpha)$ are verified.

Lemma F.1 (1/t envelope of $\mu$). For any $t \geq 0$ and $0 \leq \alpha \leq 1$, it holds that $$(1-\alpha)\alpha^t \leq \frac{1}{t+1}.$$

Proof. Setting the derivative to zero, the global maximum occurs at $$\alpha^* = \frac{t}{t+1}.$$

Thus, $$(1-\alpha^*)(\alpha^*)^t = \frac{1}{t+1}\left(1 - \frac{1}{t+1}\right)^t \leq \frac{1}{t+1},$$

Corollary F.2. Let $T \geq 1$. For $t = 1, \ldots, T$, let $\alpha_6 \in [0, 1]$ be different in general. Then, $$\sum_{t=1}^{T} (1 - \alpha_t)\alpha_t^{t-1} \leq H_n = O(\log T),$$

where $H_n$ denotes the n-th harmonic number.

Lemma F.3 ($l_1$-norm is small). For all $T \geq 1$ and $0 \leq \alpha \leq 1$, we have $$\|\mu(\alpha)\|_1 \leq 1.$$

Proof. We have $$\|\mu(\alpha)\|_1 = (1-\alpha)\sum_{t=1}^{T} \alpha^{t-1} \leq (1-\alpha)\sum_{t=1}^{\infty} \alpha^{t-1} = 1,$$

Lemma F.4 ($l_2$-norm is small and Lipschitz). For all $T \geq 1$ and $0 \leq \alpha \leq 1$, we have $$\|\mu(\alpha)\|^2 \leq 1. \qquad \text{(i)}$$

$$\left|\frac{d}{d\alpha} \|\mu(\alpha)\|^2\right| \leq 3. \qquad \text{(ii)}$$

Proof. For the first inequality, compute $$\|\mu(\alpha)\|^2 = \sum_{i=1}^{T}((\alpha-1)\alpha^{i-1})^2 = \sum_{i=1}^{T}\alpha^{2i} - 2\alpha^{2i-1} + \alpha^{2i-2}$$

$$= \frac{(\alpha^2 - 2\alpha + 1)(1-\alpha^{2T})}{1-\alpha^2} = \frac{(1-\alpha)(1-\alpha^{2T})}{1+\alpha} \leq 1.$$

For the second, differentiate the closed form to obtain $$\left|\frac{d}{d\alpha}\|\mu(\alpha)\|^2\right| = \left|\frac{2(\alpha^T - 1) + T\alpha^{T-1}(\alpha^2-1)}{(1+\alpha)^2}\right| \leq \frac{2(1-\alpha^T) + T\alpha^{T-1}(1-\alpha^2)}{(1+\alpha)^2}$$

$$= \frac{2-\alpha^T}{(1+\alpha)^2} + \frac{T\alpha^{T-1}(1-\alpha)}{1+\alpha} \leq 2 + T\alpha^{T-1}(1-\alpha) \leq 3,$$

where the final inequality uses Lemma F.1.

In addition, to bolster the above calculations with regard to the favorable regret bound of the proposed algorithm, it is shown that the Lipschitz constant for LDS, $L_y$, is bounded by $\|B\|_F\|C\|_F R_x$.

Lemma F.5. Let $\Theta=(A, B, C, D, h_0)$ be a true LDS, which produces outputs $y_1, \ldots y_T$ from inputs $x_1, \ldots, x_T$ by the definition in the recurrence, without noise. Let $0 \preceq A \preceq 1$, and $\|B\|_F, \|C\|_F, \|D\|_F, \|h_0\| \leq R_\Theta$. Then, we have that for all t, $$\|y_t - y_{t-1}\| \leq O(R_\Theta^2 R_x).$$

Proof. We have that for $1 \leq t \leq T$, $$\|y_t - y_{t-1}\| =$$

$$\left\|(CB+D)x_t - Dx_{t-1} + \sum_{t=1}^{T-1} C(A^t - A^{t-1})Bx_{t-1} + C(A^t - A^{t-1})h_0\right\| \leq$$

$$(\|B\|_F \|C\|_F + 2\|D\|_F)R_x + \|B\|_F \|C\|_F R_x + \frac{\|C\|_F \|h_0\|}{t},$$

where the inequality on the second term arises from Lemma F.3 and the inequality on the third from Lemma F.2. This implies the lemma.

The disclosed online wave-filtering approach was tested against conventional approaches in a simulated setting to demonstrate the benefits of the proposed algorithm. Constructed are two difficult systems, on which we run EM and subspace identification (SSID), followed by Kalman filtering to obtain predictions. Note that the proposed algorithm runs significantly (>1000 times) faster than this traditional pipeline.

Figure 3A:
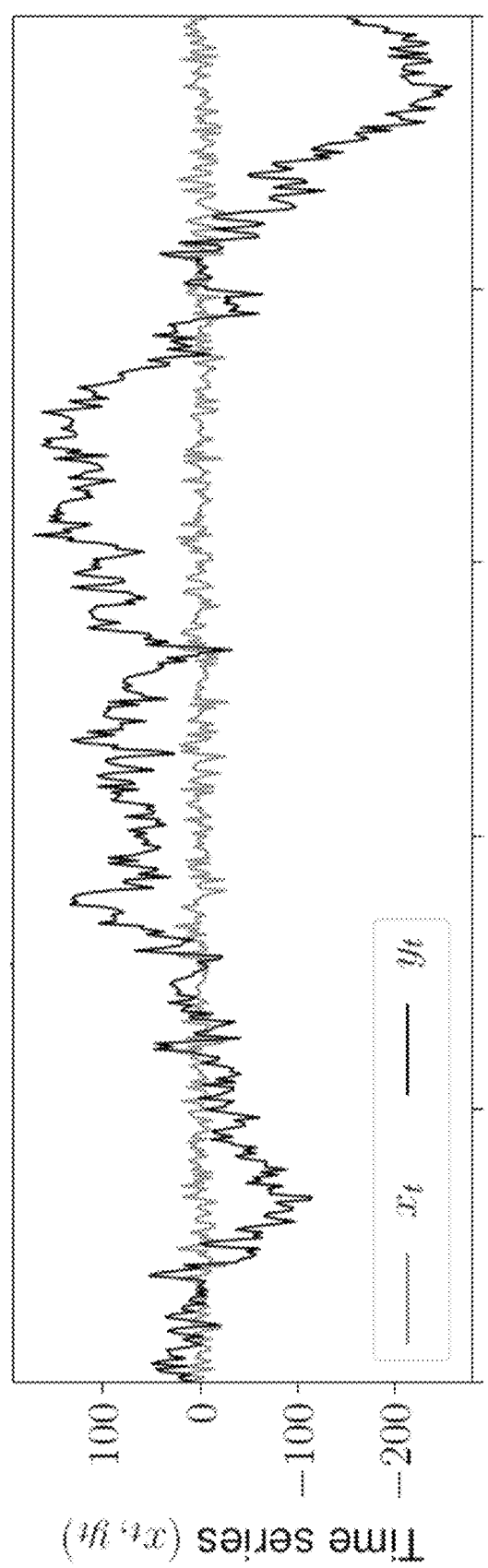
FIGS. 3A-3D are graphs showing visualizations of online learning algorithms according to embodiments of the present disclosure.
Figure 3B:
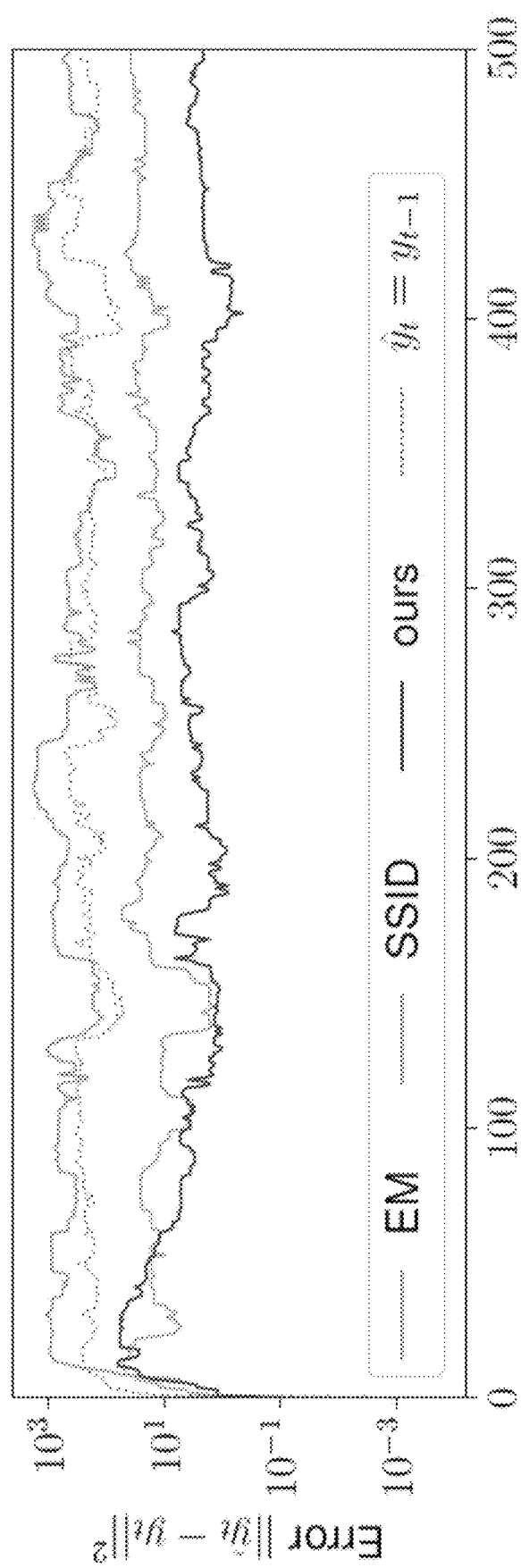

FIGS. 3A-3D are graphs showing visualizations of online learning algorithms according to embodiments of the present disclosure. FIGS. 3A and 3B depict a first example, including a SISO system (n=m=1) and d=2; all $x_t$, $\xi_t$, and $\eta_t$ are i.i.d. Gaussians, and BT=C=[1,1], D=0. Further, A=diag ([0:999; 0:5]) is ill-conditioned, so that there are long-term dependences in the time-series between input and output. Observe that although EM and SSID both find reasonable guesses for the system's dynamics, they result in local optima. The proposed algorithm learns to predict as well as the best possible LDS.

Figure 3C:
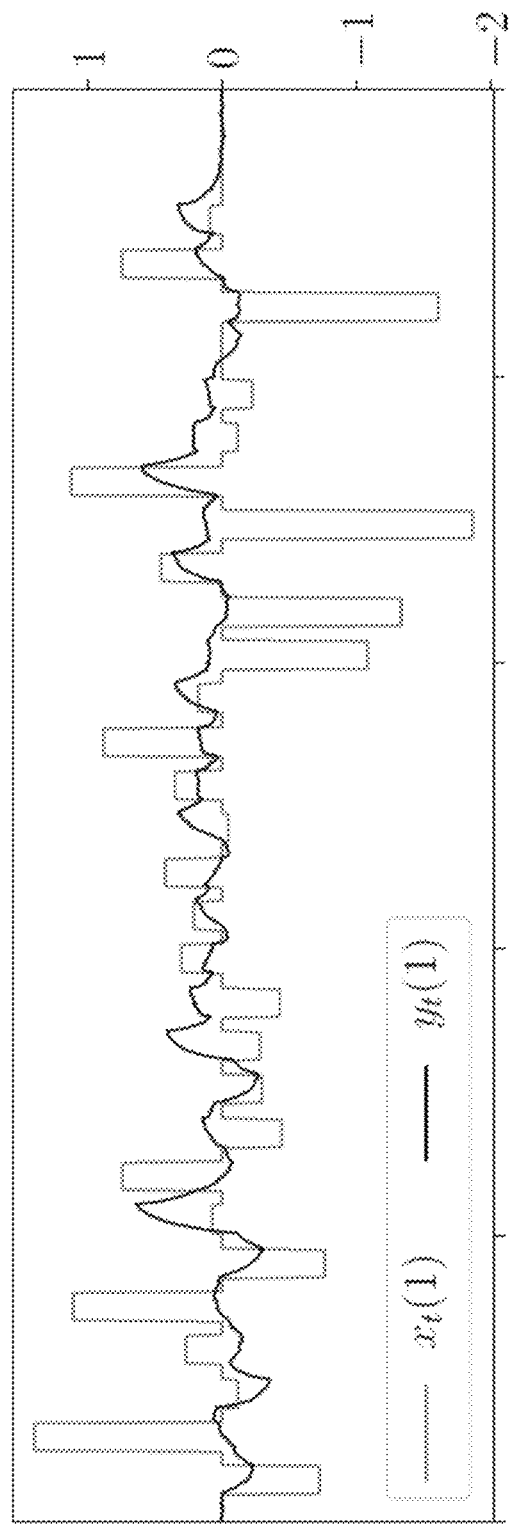
Figure 3D:
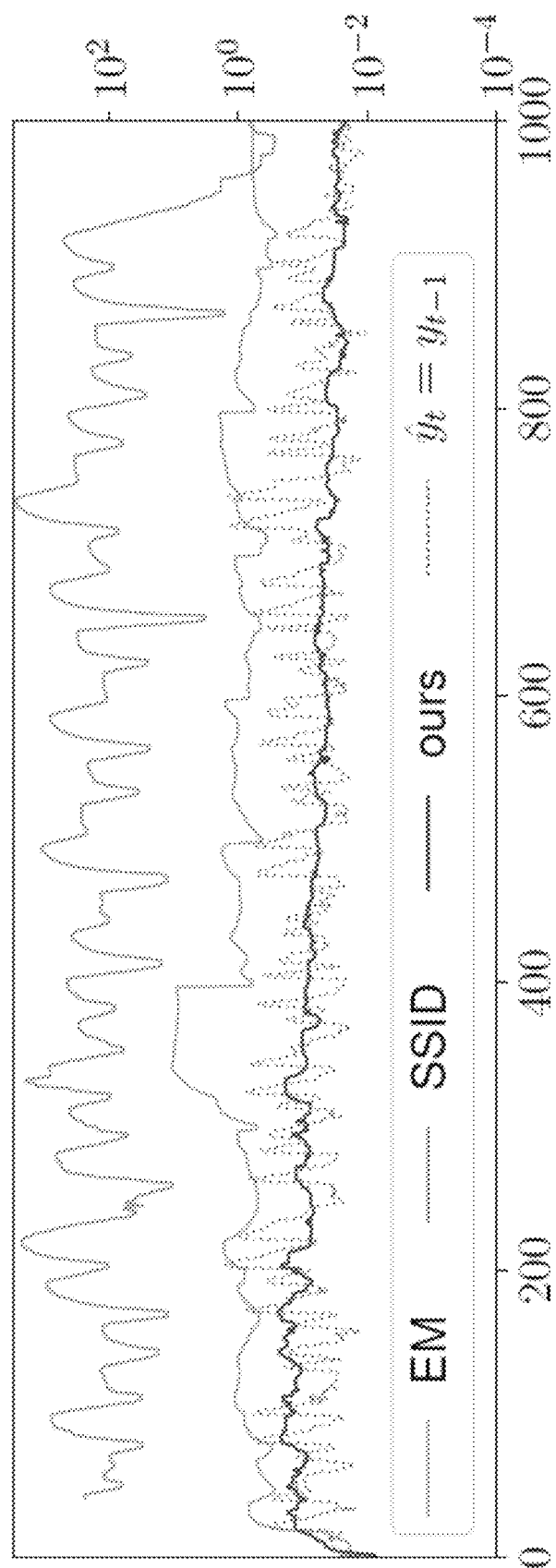

FIGS. 3C and 3D depict a second example of a MIMO system (with n=m=d=10), also with Gaussian noise. The transition matrix A=diag ([0, 0.1, 0.2, . . . , 0.9]) has a diverse spectrum, the observation matrix C has i.i.d. Gaussian entries, and $B=I_n$, $D=0$. The inputs $x_t$ are random block impulses. This system identification problem is high-dimensional and non-convex, thus it is thus no surprise that EM and SSID consistently fail to converge.

Accordingly, embodiments of the proposed online learning algorithm (e.g., Algorithm 1) achieve significantly improved results when compared to conventional non-convex optimized solutions for challenging optimization problems. The proposed algorithm finds convergence and provides more stable and reliable predictions than these non-convex conventional approaches. In addition, the proposed algorithm achieves such results as significantly faster time periods. In disclosed embodiments faster time periods may include faster algorithms in terms of running time, for example, on a digital computer. Thus, disclosed embodiments of the invention can provide improved results that may be attained when compared to conventional solutions for a specific non-convex optimization problem of system identification, which is the methodology of identifying the systems of a linear dynamical system explicitly (i.e., without improper learning).

In addition, the proposed algorithm achieves this result with less computational complexity, thus allowing the algorithm to run scalably on densely-sampled or high-dimensional time series, without incurring exponential growth in running time or a loss of theoretical guarantees on its predictions.

While online gradient descent is provided as an example to implement the proposed algorithm due to its simplicity and stability under worst-case noise, in practice, particularly when there are additional structural assumptions on the data, we can replace the update step with that of any suitable regret function such as a low-regret algorithm. AdaGrad, Adaptive subgradient methods for online learning and stochastic optimization, *The Journal of Machine Learning Research*, 12:2121-2159, 2011, is one example, as it is likely to find learning rates better than those guaranteed theoretically.

For instance, if noise levels are relatively low and it is known a priori that the data is generated from a true LDS, an approach might be to use follow-the-leader, Efficient algorithms for online decision problems, *Journal of Computer and System Sciences*, 71(3):291-307, 2005, or any of its variants. This amounts to replacing the update step with $$M_{t+1} := \min_M \sum_{t'=1}^{t} \|y_{t'} - \hat{y}_{t'}(M)\|^2$$

a linear regression problem solvable via, e.g. conjugate gradient. For such iterative methods, it is possible to use the previous predictor $M_{t-1}$ as a warm start.

In another embodiment, an example of the above denoted wave-filtered "Algorithm 1" is:

1: Input: time horizon T, filter parameter k, learning rate η, clipping param- eter $R_M$.

-continued

```
2:    Compute {(σⱼ, φⱼ)}ⱼ₌₁ᵏ, the top k eigenpairs of Z_T.
3:    Initialize M₁ ∈ ℝ^(m×k'), where k' = nk + 2n + m.
4:    for t = 1,...,T do
5:        Compute X̃ ∈ ℝ^k', with first nk entries X̃_{i,j} =
          σⱼ^(1/4) Σ_{δ=1}^{T-1} φⱼ(δ)x_{t-δ}(i), followed by the 2n + m entries of
          x_{t-1}, x_t, and y_{t-1}.
6:        Predict ŷ_t := M_t X̃.
7:        Observe y_t. Suffer loss ||y_t − ŷ_t||².
8:        Update M_{t+1} := clip_{R_M} [M_t − 2η(y_t − ŷ_t) ⊗ X̃].⁶
9:    end for
```

This example algorithm also implements a gradient descent approach and also includes the favorable regret bound, stability, and efficiency advantages related to the disclosed online wave-filtering algorithm at least due to the use of the previously described filters $\{\phi_j\}$ and scaling factors $\{\sigma_j^{1/4}\}$, as explained throughout this disclosure.

Figure 4:
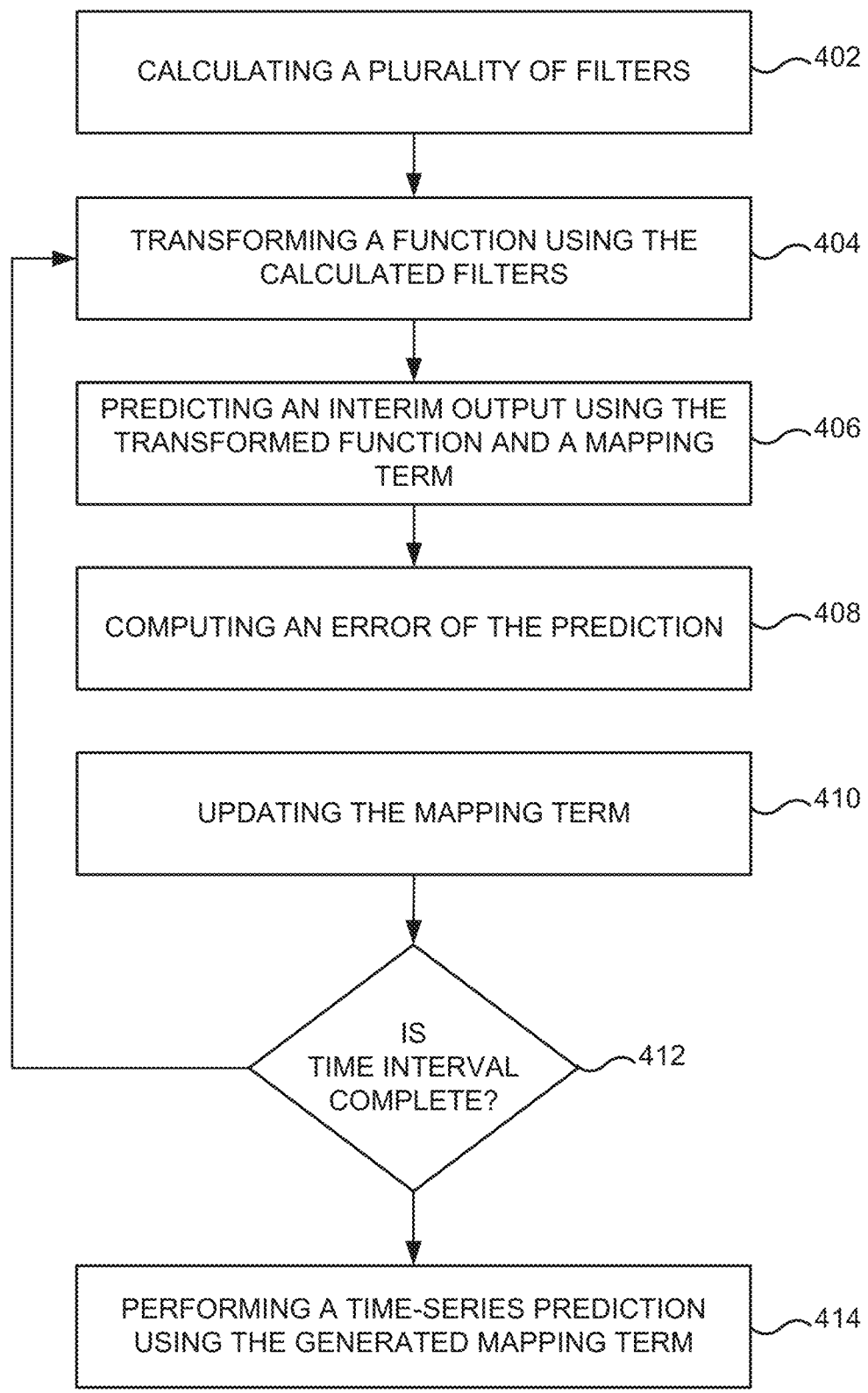
FIG. 4 is an method for performing time series prediction by improper learning according to one embodiment of the present disclosure.

FIG. 4 illustrates a flow diagram for performing time series prediction by improper learning according to an example embodiment. In one embodiment, the flow diagram of FIG. 4 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 402, a plurality of filters can be calculated. For example, a plurality of filters can be calculated based on a symmetric matrix, such as a Hankel matrix. The filters can be wave-form filters calculated according to eigenvector(s) and/or of the symmetric matrix. For example, the filters can comprise $\phi_j$ of Algorithm 1, disclosed above. It should be appreciated that other filters may be utilized with the teachings of the invention. For example, a-prior filter computable by some mathematical formula, and independent of the data. Such filters can be the eigenvectors of a Hankel matrix, but also other matrices that are data-independent.

At 404, a function used in performing the prediction can be transformed according to the calculated filters. For example a function, such as x(t) of Algorithm 1 disclosed above, can be transformed using the calculated filters. In some embodiments, that transformed function can be $\tilde{X}$ of Algorithm 1. For example, the transformation can be represented by $\tilde{X}_{(i,j)} := \sigma_j^{1/4} \Sigma_{n=1}^{T-1} \phi_j(u) x_{t-u}(i)$, followed by the 2n÷m, as disclosed in Algorithm 1. In some embodiments, the transformation reduces the optimization complexity for a regret bound of the function, as detailed in this disclosure.

At 406, an interim output can be predicted using the transformed function and a mapping term. For example, the mapping term can be a matrix that is updated through the iterative learning process. In some embodiments, the prediction can be represented by $\hat{y}_t := M_t \tilde{X}$, as disclosed in Algorithm 1.

At 408, an error of the prediction can be computed. For example, an error of the predicted interim output can be computed based on a known output. The known output can be what is conventionally referred to as training data or annotated data for the learning algorithm. In some embodiments, the observed error can be represented by Observe $y_t$. Suffer loss $||y_t - \hat{y}_t||^2$, as disclosed in Algorithm 1. For example, the learning algorithm can implement gradient descent such that the squared loss is minimized.

At 410, the mapping term can be updated. For example, the mapping term can be updated based on the computer error. In some embodiments, the updated to the mapping term can be represented by Gradient update: $M_{t+1} \leftarrow M_t - 2\eta (y_t - \hat{y}_t) \otimes \tilde{X}$, as disclosed in Algorithm 1.

At 412, it can be determined whether a time interval is complete. For example, 404 to 410 can be iterated multiple times in order to update the mapping term according to the disclosed learning algorithm. The iteration can continue until a time interval has elapsed. For example, the iteration can be represented by the for loop for t−1, . . . , T do, as disclosed in Algorithm 1.

At 414, a prediction of a time-series can be performed using the generated mapping term. For example, the iterations of 404 to 410 can generate a mapping term useful for time series prediction, for example based on the gradient descent algorithm implemented and minimized error achieved. The prediction can take a form similar to $y = M_t x$ using $M_t$ as the mapping term to predict y of the time series according to the function x.

Embodiments of the online learning algorithm can be used to achieve a number of computational challenging applications. In particular, machine learning has been leveraged to diversify the things machines can do. For example, advancements in computer vision have led to a wide variety of implementations, such as self-driving cars. Other applications can include language processing and machine translation, tactile recognition tasks, financial modeling and prediction, and countless others. By transforming a previously computationally challenging (or impossible) optimization problem to a more practical and/or solvable form (e.g., transforming a non-convex problem to a convex problem) the proposed online learning algorithm improves the functioning of a computer by further diversifying what things machines can do and further improving the computationally challenging things machines currently do. For example, the proposed online learning algorithm can leverage the learning capabilities of a neural network to achieve improvements in a number of fields. For example, the invention may be further enhanced, by using a neural network in addition to the wave filter. This embodiment would first filter the input, then give the output to the neural network in lieu of step 406 in FIG. 4. The neural network can be trained by any off-the-shelf training algorithm such as stochastic gradient descent (also known as backpropagation). Various implementations of the online learning algorithm realize improvements to technological applications, such as computer vision. Other applications include language-to-language translation. Another application is for image processing is scene understanding (relatedly, video frame prediction); this is a common primitive implemented by autonomous driving systems.

In addition, another technological application of the online learning algorithm include, language modeling which is a specific instance of time-series modeling, in which a system receives a stream of word tokens (the input time series), and is expected to output a probability distribution representing possible predictions for the successive word. The objective is for the system to make correct and correct predictions, typically measured the numerical quantity of perplexity. The proposed algorithm, enhanced with a neural network, provides a general framework which encompasses this task as a special case of high-dimensional time-series prediction.

Lastly, an alternative to the online setting of the proposed algorithm is a batch solution. The online prediction setting is sensitive to permutation of the time series: that is, the same LDS does not in general map $\{x_{o(1)}, \ldots, x_{o(T)}\}$ to $\{y_{o(1)}, \ldots, y_{o(T)}\}$. As such, one must take care when defining the batch case: the output time series (and thus, loss functions) are correlated, so it is not meaningful to assume that they are i.i.d. samples from a distribution. Thus, the proposed online regret bound, which concerns a single episode, does not translate directly. However, the proposed convex relaxation technique still allows efficient improper learning with least-squares regression, giving interesting and novel statistical guarantees.

Two example formulations of the batch setting are provided. In both cases, it is most natural to fix an episode length T, and consider a rollout of the system $\{(x_t, y_t)\}_{t=1}^T$ to be a single example. For instance, let $X_i \in \mathbb{R}^{Tn}$ denote the concatenated vector of inputs for a single example, and $Y_i \in \mathbb{R}^{Tm}$ the concatenated responses. The batch formulation is to learn the dynamics of the system using N samples $\{(X_i, Y_i)\}$. Recall that the samples satisfy $\|x_t\|_2 \leq R_x$ and $\|y_t - y_{t-1}\|_2 \leq L_y$. In the batch formulation, the mean squared error of predictions, $l_{X,Y}(h)$, will be considered rather than the total squared error. In addition, h will denote a hypothesis instead of $\Theta$.

Here, we can start with the assumption that $h_0 = 0$ As noted, the sequential prediction algorithm can be restricted so as to never make updates to the submatrix $M^{(y)}$, keeping it to be the identity matrix. Notice that all other features in $\tilde{X}$ consist of inputs $x_t$ and their convolutions. In other words, we can take the view that the matrix $M_t$ can be used to predict the differences $y_t - y_{t-1}$ between successive responses, as a function of the entire (aligned) input time series $(x_t, x_{t-1}, \ldots, x_{t_T})$. Thus, we can formulate a direct analogue for the online algorithm: learn the mapping from an input time series $X_i \in \mathbb{R}^{Tn}$ to the differences $Y'_i \in \mathbb{R}^{Tm}$, the concatenation of all $y_t - y_{t-1}$. For this, we can use Theorem 3 (the approximation result) directly, and obtain an improper agnostic learning guarantee.

Specifically, let H be a subset of the hypothesis class of LDS parameters $\Theta = (A, B, C, D, h_0 = 0)$, subject to $\|B\|_F, \|C\|_F, \|D\|_F \leq R_\Theta$, and choose any approximation tolerance $\varepsilon > 0$. Then, Theorem 3 states that choosing $\hat{\mathcal{H}}$ with $k = \Omega(\log T \log(R_\Theta R_x L_y nT/\varepsilon))$ ensures the $\varepsilon$-approximate relaxation property. In the language of the batch setting: for each $h \in \mathcal{H}$ which predicts on the sample (X,Y') with a mean squared error $l_X(h)$, there is some $\hat{h} \in \hat{\mathcal{H}}$ so that:

$$l_{X,Y}(h) \leq l_{X,Y}(\hat{h}) + \varepsilon$$

In order to mimic Algorithm 1, a least squared regression can be run on $\tilde{X}$ and Y where $\tilde{X}$ is the same featurization of the inputs used in the online algorithm. In an embodiment, an example batch, or offline, wave-filtering algorithm is:

---

Algorithm 2 Offline wave-filtering algorithm
for learning the derivative

---

1: Input: S = $\{(X_i, Y'_i)\}$. a set of N training samples, each of length T; filter parameter k.
2: Compute $\{(\sigma_j; \phi_j,)\}_{j=1}^k$, the top k eigenpairs of $Z_T$.
3: Initialize matrices $X \in \mathbb{R}^{(nk+2n) \times NT}$, $Y' \in \mathbb{R}^{m \times NT}$.
4: for each sample (X, Y') do
5:     for t = 1,...,T do
6:         Compute $\tilde{X}_t \in \mathbb{R}^{nk+2n}$, with first nk entries $\tilde{X}_{(i,j)} := \sigma_j^{1/4} \Sigma_{u=1}^{T-t} \phi_j(u) x_{t-u}(i)$, followed by the 2n entries of $x_{t-1}, x_t$.
7:         Append $(\tilde{X}_t, Y_t')$ as new columns to the matrices X, Y'.
8:     end for
9: end for
10: return least-squares solution $(XX\tilde{X}^T)^\dagger XX^T Y'$.

---

By definition, Algorithm 2 minimizes the empirical MSE loss on the samples; as such, a PAC-learning bound for regression can be derived. As in the statement of the online algorithm, as a soft dimensionality restriction, we constrain the comparator class $\mathcal{H}$ to contain LDSs with parameters $\Theta = (A, B, C, D, h_0 = 0)$ such that $0 \preceq A \preceq I$ and $\|B\|_F, \|C\|_F, \|D\|_F, \|h_0\| \leq R_\Theta$. For an empirical sample set S, let $$\ell_S(h) = \frac{1}{|S|} \Sigma_{(X,Y) \in S} \ell_{X,Y}(h).$$

Similarly, for a distribution $\mathcal{D}$, let $\ell_\mathcal{D}(h) = \mathbb{E}_{(X,Y) \sim \mathcal{D}}[l_{X,Y}(h)]$. Theorem 2 (Generalization of the batch algorithm). Choose any $\varepsilon > 0$. Let $S = \{(X_i, Y'_i)\}_{i=1}^N$ be a set of i.i.d. training samples from a distribution D. Let $$\hat{h} \stackrel{def}{=} \text{argmin}_{h \in \mathcal{H}} \ell_S(h)$$

be the output of Algorithm 2, with a choice of $k = \Theta(\log^2 T \log(R_\Theta R_x \hat{L}_y \pi/\delta))$. Let $$h^* \stackrel{def}{=} \text{argmin}_{h^* \in \mathcal{H}} \ell_\mathcal{D}(h)$$

be the true loss minimizer. Then, with probability at least $1 - \delta$, it holds that $$\ell_\mathcal{D}(\hat{h}) - \min_{h \in \mathcal{H}} \ell_\mathcal{D}(h) \leq$$

$$\varepsilon + \frac{O\left(R_\Theta^4 R_x^2 L_y \log^2(R_\Theta R_x L_y n/\varepsilon) n \log^6 T + \sqrt{\log 1/\delta}\right)}{\sqrt{N}}.$$

Proof. Lemma D.1 shows that this lets us restrict our consider to matrices in $\hat{\mathcal{H}}$ with small Frobenius norm:

$$\|M\|_F \leq O(R_\Theta^2 \sqrt{k}).$$

Thus, the empirical Rademacher complexity of $\hat{\mathcal{H}}$ on N samples, with this restriction, thus satisfies $$\mathcal{R}_N(\hat{\mathcal{H}}) \leq O\left(\frac{R_\Theta^2 R_x \sqrt{k}}{\sqrt{N}}\right).$$

Also, no single prediction error (and thus neither the empirical nor population loss) will exceed the upper hound $$\ell_{max} \stackrel{def}{=} \Theta(R_\Theta^4 R_x^2 L_y^2 k).$$

Finally, the loss is $G_{max}$-Lipschitz in the matrix h, where $G_{max}$ is the same upper bound for the gradient as mentioned in Section 4.2. Lemma D.5, states that this is bounded by $O(R_\Theta^2 R_x^2 L_y \cdot nk^{3/2} \log^2 T)$.

With all of these facts in hand, a standard Rademacher complexity-dependent generalization bound holds in the improper hypothesis class $\hat{\mathcal{H}}$ (see. e.g. [BM02]):
Lemma A.1. (Generalization via Rademacher complexity). With probability at least $1 - \delta$, it holds that $$\ell_D(\hat{h}) - \ell_D(\hat{h}^*) \leq G_{max}\mathcal{R}_N(\hat{\mathcal{H}}) + \ell_{max}\sqrt{\frac{8 \ln 2/\delta}{N}}$$

With the stated choice of k, an upper bound for the RHS of Lemma. A.1 is $$\frac{O\left(R_\Theta^4 R_x^2 L_y \, \log^2(R_\Theta R_x L_y n/\varepsilon) n \, \log^6 T + \sqrt{\log 1/\delta}\right)}{\sqrt{N}}.$$

Combining this with the approximation results (Theorem 3) completes the proof.

A natural question is whether there exists a batch learning algorithm that can use X to predict Y directly, as opposed to the differences Y'. One possibility is in the regime of low noise: if one has predictions on Y' that are correct up to MSE ε, one solution is to integrate and obtain predictions for Y; however, in some embodiments errors will accumulate to Tε. The same agnostic learning finds costs a rather dramatic factor of $T^2$ in sample complexity. In the regime of low noise, an analogue of our approximation theorem (Theorem 3) is powerful enough to guarantee low error. For convenience and concreteness, this is provided:

Theorem 3b (Pure-batch approximation). Let Θ be an LDS specified by parameters (A, B, C, D, $h_0=0$), with $0 \preceq A \preceq I$, and $\|B\|_F$, $\|C\|_F$, $\|D\|_F \leq R_\Theta$. Suppose Θ takes an input sequence $X=\{x_1, \ldots, x_T\}$, and produces output sequence $Y=\{y_1, \ldots, y_T\}$, assuming all noise vectors $\xi_t, \eta_t$ are 0. Then for any ε>0, with a choice of $k=\Omega(\log^2 T \log(R_\Theta R_x L_y/\varepsilon))$, there exists an $M_\Theta \in \mathbb{R}^{m \times \{nk+2n\}}$ such that $$\sum_{t=1}^{T} \left\| \left(\sum_{u=1}^{t} M_\Theta \tilde{X}_u\right) - y_t \right\|^2 \leq \sum_{t=1}^{T} \|\hat{y}_t - y_t\|^2 + \varepsilon,$$

where $\tilde{X}_t$ is defined as in Algorithm 1, without the $y_{t-1}$ entries.

This fact follows from Theorem 3, setting ε/T as the desired precision; the cost of this additional precision only a constant factor in k. Furthermore, this $M_\Theta$ is subject to the same Frobenius norm constraint $\|M_\Theta\|_F \leq O(R_\Theta^2 \sqrt{k})$ as in Lemma D.1.

Alternatively, in a realizable case (when the samples from D are generated by an LDS, possibly with small noise), one can invoke a similar approximate relaxation theorem as Theorem 3. The filters become the eigenvectors of the Hilbert matrix $H_{T, -1}$, the matrix whose (i, j)-th entry is 1/(i+j−1). This matrix exhibits the same spectral decay as $Z_T$. The Hilbert matrix arises from taking the second moment matrix of the uniform distribution on this curve. However, it is found that this approximation guarantee does not show the strong regret and agnostic learning bounds we exhibit for learning the derivative of the impulse response function. Nonetheless, find that regression with these filters works well in practice, even interchangeably in the online algorithm.

In either of the above settings, it is not quite possible to apply the same argument as in the online setting for pretending that the initial hidden state is zero. When this assumption is removed, the quality of the convex relaxation degrades by an additive $$\tilde{O}\left(\frac{\log^2 T}{T}\right).$$

This does not matter much for the regret bound, because it is subsumed by the worst-case regret of online gradient descent. However, in the batch setting, view can be taken of fixed T and increasing N, so the contribution of the initial state is no longer asymptotically negligible. In other words, this additive approximation error hinders us from driving arbitrarily close to zero, no matter how many filters are selected. In settings where T is large enough, one may and this acceptable. We present an augmented learning problem in which we can predict as well as an LDS: the initial hidden state is provided in each sample, up to an arbitrary linear transformation. Thus, each sample can take the form (X, Y, $h_0$), and it is guaranteed that $h_0 = Qh_0$ for each sample, for a fixed matrix $Q \in \mathbb{R}^{d' \times d}$. This Q must be well-conditioned for the problem to remain well-posed: our knowledge of $h_0$ can be in the same dynamic range as the ground truth. Concretely, we can assume that $\sigma_{max}(Q)/\sigma_{min}(Q)$, is bounded. One sample construction is as follows: append d' "dummy" dimensions to the input, and add an impulse of $\tilde{h}_0$ those dimensions at time 0. During the actual episode, these dummy inputs can be zero. Then, replacing B with the augmented block matrix [B $Q^{-1}$] recovers the behavior of the system. Thus, the sample construction can handle this formulation of hidden-state learning in the online or batch setting, incurring no additional asymptotic factors.

In an embodiment, for a special case of the formulation discussed above, consider a batch system identification setting in which there are only finitely many initial states $h_0$ in the training and test data, and the experimenter can distinguish between these states. This can be interpreted a set of n-hidden known initial "configurations" of the system. Then, it is sufficient to augment the data with a one-hot vector in $\mathbb{R}^{n_{hidden}}$, corresponding to the known initialization in each sample. One case is when n-hidden=1: when there is only one distinct initial configuration; this occurs frequently in control problems. In summary, the stated augmentation takes the original LDS with dimensions (n, m, d, T), and transforms it into one with dimensions (n+$n_{hidden}$, m, d, T+1). The matrix $Q^{-1}$, as defined above, is the n-hidden-by-d matrix whose columns are the possible initial hidden states, which can be in arbitrary dimension. For convenience, this observation is summarized:

Proposition A.2 (Hidden state). In the case of finitely many known hidden states, with $\|h_0\| \leq R_\Theta$, Theorems 2, 3, and 3b apply to the modified LDS learning problem, with samples of the form ($h_0$, X, Y).

Having described the many embodiments of the present disclosure in detail, it will be apparent that modifications and variations are possible without departing from the scope of the disclosure defined in the appended claims. Furthermore, it should be appreciated that all examples in the present disclosure, while illustrating many embodiments, are provided as non-limiting examples and are, therefore, not to be taken as limiting the various aspects so illustrated.

The system, as described in the present technique or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present technique.

The computer system comprises a computer, an input device, a display unit and/or the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing or a request made by another processing machine.

REFERENCES

The following references are referred to above and are incorporated herein by reference:
1. Elad Hazan, Karan Singh, and Cyril Zhang. *Learning linear dynamical systems via spectral filtering.* In Advances in Neural Information Processing Systems, pp. 6705-6715, 2017.
2. Elad Hazan, Holden Lee, Karan Singh, Cyril Zhang, and Yi Zhang. *Spectral filtering for general linear dynamical systems.* arXiv preprint, arXiv: 1802.03981, 2018.

All documents, patents, journal articles and other materials cited in the present application are incorporated herein by reference.

While the present disclosure has been disclosed with references to certain embodiments, numerous modification, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What is claimed is:

1. A method of performing time series prediction by improper learning, the method comprising:
   calculating a plurality of filters based on top k eigenpairs of a Hankel Matrix, wherein k is an integer;
   transforming a function using the calculated plurality of filters;
   predicting an interim output of a time series input using the transformed function and a mapping term;
   computing an error of the interim output based on a known output;
   updating the mapping term based on the computed error;
   iterating the transforming, predicting, computing, and updating steps over a predetermined interval;
   training a neural network using the time series input and corresponding training data;
   performing, using the trained neural network, a time series prediction using the mapping term generated over the iterations.

2. The method of claim 1, wherein the error is computed based on a regret function.

3. The method of claim 1, wherein an optimization complexity for a first regret function of the transformed function is less than the optimization complexity for a second regret function of the function.

4. The method of claim 3, wherein a first regret bound of the transformed function is convex and a second regret bound of the function is non-convex.

5. The method of claim 1, wherein the mapping term is a matrix.

6. The method of claim 1, wherein the filters comprise wave-form filters.

7. The method of claim 1, wherein the time series input relates to video and the performed time series prediction comprises object recognition in the video.

8. The method of claim 1, wherein the time series input comprises language and the performed time series prediction comprises language processing.

9. A method of performing time series prediction by improper learning, the method comprising:
   calculating a plurality of filters based on top k eigenpairs of a Hankel Matrix, wherein k is an integer;
   generating a mapping term based on a time series input and a function, the generating comprising iteratively:
      transforming the function using the calculated plurality of filters;
      predicting an interim output using the transformed function;
      computing an error of the interim output based on a known output; and
      updating the mapping term based on the computed error;
      wherein the mapping term is generated through iterations over a predetermined interval;
   training a neural network using the time series input and corresponding training data; and
   performing, using the trained neural network, a time series prediction using the mapping term generated over the iterations.

10. The method of claim 9, wherein the error is computed based on a regret function.

11. The method of claim 9, wherein an optimization complexity for a first regret function of the transformed function is less than the optimization complexity for a second regret function of the function.

12. The method of claim 11, wherein a first regret bound of the transformed function is convex and a second regret bound of the function is non-convex.

13. The method of claim 9, wherein the generated mapping term is a matrix.

14. The method of claim 9, wherein the filters comprise wave-form filters.

15. The method of claim 9, wherein the time series input relates to video and the performed time series prediction comprises object recognition in the video.

16. The method of claim 9, wherein the time series input comprises language and the performed time series prediction comprises language processing.

* * * * *